United States Patent [19]

Rich et al.

[11] Patent Number: 5,636,123
[45] Date of Patent: Jun. 3, 1997

[54] TRAFFIC ALERT AND COLLISION AVOIDANCE CODING SYSTEM

[76] Inventors: Richard S. Rich, 2670 Mineral Point Rd., Friday Harbor, Wash. 98250; Michael W. Anderson, P.O. Box 4175, McCall, Id. 83638

[21] Appl. No.: 275,801

[22] Filed: Jul. 15, 1994

[51] Int. Cl.[6] .............................. G01S 3/02; G06F 17/14; G06F 17/15

[52] U.S. Cl. .................. 364/461; 364/449.1; 364/460; 342/29; 342/32; 342/455; 370/320; 455/33.1; 455/61; 455/38.1

[58] Field of Search .................. 364/461, 460, 364/453, 452, 449, 450; 342/36, 31, 456, 455, 454, 463, 357, 29, 32; 370/18, 22; 375/116, 115; 455/33.1, 61, 38.1

[56] References Cited

U.S. PATENT DOCUMENTS

| | | | |
|---|---|---|---|
| 3,550,129 | 12/1970 | Steele | 343/112 |
| 4,196,434 | 4/1980 | Funatsu et al. | 343/6.5 R |
| 4,232,313 | 11/1980 | Fleisham | 343/4 R |
| 4,611,209 | 9/1986 | Lemelson et al. | 343/6.5 R |
| 4,823,272 | 4/1989 | Inselberg | 364/461 |
| 4,835,537 | 5/1989 | Manion | 342/30 |
| 4,910,526 | 3/1990 | Donnangelo et al. | 342/455 |
| 5,058,024 | 10/1991 | Inselberg | 364/461 |
| 5,075,694 | 12/1991 | Donnangelo et al. | 342/455 |
| 5,099,245 | 3/1992 | Sagey | 342/357 |
| 5,119,341 | 6/1992 | Youngberg | 367/5 |
| 5,153,836 | 10/1992 | Fraughton et al. | 364/461 |
| 5,210,534 | 5/1993 | Janex | 340/984 |
| 5,313,457 | 5/1994 | Hostetter et al. | 370/18 |
| 5,398,034 | 3/1995 | Spilker, Jr. | 342/357 |
| 5,450,395 | 9/1995 | Hostetter et al. | 370/18 |

OTHER PUBLICATIONS

Su et al., "3.D Cellular Systems for Air-Land Communications", IEEE, 1994 (Apr.), pp. 485-489.

Kinoshita et al., "High Density Space Division Multiple Access: Double Reuse of Frequency Channels", IEEE, Apr. 1994, pp. 552-557.

*Primary Examiner*—Kevin J. Teska
*Assistant Examiner*—Thai Phan
*Attorney, Agent, or Firm*—Christensen O'Connor Johnson & Kindness PLLC

[57] ABSTRACT

A system for coding and transmitting traffic alert and collision avoidance data between vehicles (A, B and C) traveling within a given airspace (12). The airspace is divided into a grid of volume elements (14a, 14b ... 14i), each of which is assigned a unique pseudonoise (PN) code. A vehicle (A) traveling through the airspace determines its position using signals from Global Positioning System (GPS) satellites. The vehicle's position places it within one of the volume elements in the airspace. A Traffic Alert and Collision Avoidance System (TCAS) transmitter (38) on the vehicle creates a navigation message that describes the position of the vehicle. A collision avoidance signal is then generated by modulating a carrier signal with the PN code representing the volume element containing the transmitting vehicle and with the navigation message. The collision avoidance signal is transmitted on a common communications channel using time-multiplexing based on a pseudorandom sequence. Other vehicles operating within the same airspace use a TCAS receiver to receive the collision avoidance signals broadcast from each vehicle. Each receiving vehicle in the airspace only tracks collision avoidance signals produced by vehicles located in its own and surrounding volume elements to determine if an impending collision is likely. Specifically, only the navigation messages from vehicles in the same or surrounding volume elements are decoded to determine the position of the other vehicles. Based on calculated vehicle paths, a warning of an impending collision or instructions on how to avoid a collision are provided to the operator of the receiving vehicle.

49 Claims, 12 Drawing Sheets

TRAFFIC ALERT AND COLLISION AVOIDANCE CODING SYSTEM

FIELD OF THE INVENTION

This invention relates generally to Traffic Alert and Collision Avoidance Systems (TCAS), and more particularly to a system for coding and transmitting traffic alert and collision avoidance data between vehicles.

BACKGROUND OF THE INVENTION

An increasing amount of vehicular traffic in the world's airways, highways, and waterways has unfortunately resulted in increased potential for vehicle collisions with other vehicles or fixed objects. U.S. and foreign governments, as well as industry, have recognized that an anti-collision system that actively prevents collisions from occurring presents the greatest potential for improving the safety of transportation. An anti-collision system would ideally alert vehicle operators to the likelihood of a collision in time to allow the operators to take evasive action designed to prevent the collision from occurring.

The problem of vehicle collisions is especially acute with aircraft, as there is usually a disastrous loss of life and property. In an effort to prevent aircraft collisions, the Federal Aviation Administration (FAA) mandated that by the end of 1993 all aircraft with thirty or more seats should be equipped with collision avoidance equipment. In response to this mandate, a family of airborne devices having a range of collision avoidance capabilities known as Traffic Alert and Collision Avoidance Systems (TCAS) has been developed.

The commercial TCAS that have been developed and adopted by the FAA for implementation within the National Air Traffic Control System rely on the inclusion and continuous operation of Air Traffic Control Radar Beacon System (ATCRBS) transponders in all private, commercial and military aircraft. When one TCAS equipped aircraft approaches a second aircraft, the method of establishing collision avoidance communication depends upon the type of ATCRBS transponder contained in the second aircraft. The first aircraft determines the location of the second aircraft by transmitting an "all-call" interrogation signal every second. If the second aircraft is equipped with a Mode A ATCRBS transponder, the ATCRBS transponder receives the interrogation signal and responds with a signal which allows the first aircraft to calculate the range and bearing of the second aircraft based on the direction and relative strength of the signal. If the second aircraft has a Mode C ATCRBS transponder, it can include altitude information in its response.

In contrast, if the second aircraft is equipped with a Mode S ATCRBS transponder, the method of interrogation by the first aircraft is slightly different. A Mode S ATCRBS transponder automatically transmits a message containing the "address" of the transmitting aircraft once a second. The TCAS equipped aircraft sends a direct interrogation to the second aircraft, based on the known address of the second aircraft. The Mode S ATCRBS transponder of the second aircraft responds with a signal which includes altitude information. To minimize interference with other aircraft, the rate at which a Mode S aircraft is interrogated depends on the range and closing speed of the two aircraft.

While the interrogation/response is somewhat effective at establishing the relative position of the second aircraft, it also has some undesired consequences. The first or interrogating aircraft also receives messages from all other ATCRBS transponders within radio range, requiring the TCAS equipment to use special techniques to filter out the unwanted signals. Furthermore, the strength of the response signal is potentially inconsistent due to variations in ATCRBS transponder equipment and antenna installations in different aircraft resulting in imprecise data on which to base collision avoidance calculations.

Regardless of the type of transponder contained in the interrogated target aircraft, the TCAS equipped aircraft uses the received signal to determine whether the flight path of the target aircraft is a potential threat. Depending upon the complexity of the TCAS equipment, the system either generates a warning signal to the pilot indicating the existence of a potential collision, or generates a warning signal and advises the pilot of the appropriate flight path deviation (conflict resolution advisory) in order to avoid a collision. Systems currently on the market have the capability of recommending vertical escape maneuvers to the pilot. Systems under development will expand this capability by providing both vertical and horizontal resolution advisories to the pilot. These systems are deficient, however, because not all aircraft have ATCRBS transponders and, of those that do, not all have Mode C or Mode S altitude reporting capability.

While the current group of TCAS are installed in large commercial aircraft, high cost has inhibited their widespread adoption in non commercial aircraft. In the United States, there are 184,433 general aviation aircraft and 7,320 air carrier aircraft (1992 data), indicating that the vast majority operate without TCAS.

The current ATCRBS transponder based TCAS also have limitations in areas of high traffic volume when system saturation may occur as the interrogation and transponder signals from different aircraft overlap and intermix. When this occurs, the collision avoidance protection provided by the system is greatly impaired when it is needed most as interrogations are missed or go unanswered.

Recent improvements in the accuracy of radio navigation aids has suggested that they might be used to create an effective anti-collision system. The most precise system currently available to the public is the Global Positioning System (GPS), which consists of a network of 24 satellites orbiting the earth. Each satellite transmits a ranging signal at 1.575 GHz. By monitoring the signal from four or more satellites, a vehicle with a GPS receiver can determine its latitude, longitude, and altitude to an accuracy of 100 meters. (A more accurate signal is available to the military.) The steadily dropping cost of GPS receivers has suggested that it will be used in more applications and greater numbers in the future.

In order for an aircraft collision avoidance system to be most effective, all aircraft should be equipped with a TCAS beacon which transmits their position, altitude, and a unique identifying address automatically, without requiring interrogation. A similar transmitting beacon could also be installed on hazardous obstructions to aircraft such as radio towers, tall buildings and mountain peaks to enable TCAS receiver equipped aircraft to identify and avoid them as well. An additional advantage to this scheme is that position and altitude information from all aircraft would also be available to Air Route Traffic Control Center (ARTCC) and tower controllers as a supplement or alternative to ground based radar. Drug enforcement and stolen aircraft tracking can also be facilitated if an aircraft is observed on radar without the accompanying TCAS beacon transmission containing its unique identifier. It is therefore a desirable goal to produce a simple and inexpensive TCAS beacon transmitter which broadcasts position, altitude, and identification that should be installed on all aircraft as well as an inexpensive TCAS receiver that will be more widely utilized than the present system. Existing ATCRBS transponder based TCAS equipment could be modified to utilize the superior position information of a GPS based system while retaining the current conflict resolution computation and display portions.

The combination of GPS with the development of an anti-collision system for vehicles has been suggested in at least one other reference. U.S. Pat. No. 5,153,836 to Fraughton et al. discloses a collision avoidance system and method that is based on determining the location of aircraft from GPS signals. FIG. 1 shows a general representation of how this system operates.

The Global Positioning System (GPS) satellites 2 emit a 1.575 GHz signal 4 that can be detected with an appropriate receiver. By comparing the signals received from the satellites, a receiver mounted in a vehicle can determine the position and velocity of the vehicle anywhere on the globe. It takes signals from a minimum of four satellites 2 to determine the latitude, longitude, and altitude of an aircraft. Only three satellite signals are required to determine the latitude and longitude of a vehicle.

As shown in FIG. 1, aircraft A and aircraft B each receive precise ranging signals transmitted by the satellites, from which they calculate their actual location (latitude, longitude and altitude). In accordance with the Fraughton et al. patent, aircraft A and B continuously transmit this information, called a navigation solution 6, in an omnidirectional pattern. Each aircraft receives the location information transmitted by the other aircraft and uses its location information plus the received location information to calculate a range vector which indicates the position and distance of the other aircraft relative to their own. For example, if aircraft B were transmitting its location, aircraft A would receive the signal and calculate range vector 10. By monitoring the range vector 10, the receiver of aircraft A can determine when an airspace conflict is about to occur, and notify the pilot of any impending collisions or dangerous situations. Obviously, aircraft B as well as other aircraft (not shown) can do the same.

Although the system proposed in Fraughton et al. is simpler than the FAA system, which relies on transponders and interrogations, it still has inherent drawbacks. Most importantly, if a high number of aircraft exist in the same airspace, the number of transmissions and receptions that must be made can cause the system to saturate. Each aircraft in Fraughton et al. omnidirectionally transmits its navigation solution on a random basis. Before transmitting, each aircraft listens to the transmission channel for a conflicting signal, and then waits a random period of time if the channel is busy. This leads to potentially dangerous situations if the delay in transmission becomes extended due to a busy communications channel.

Fraughton et al. attempts to avoid system saturation by limiting the transmission range of the navigation solution. The strength of the radio frequency transmission is monitored to insure that the transmitted signal is only transmitted with enough strength so that it will be received by aircraft within a predetermined range of interest. Aircraft receiving navigation solutions ignore low strength signals, ensuring that only transmissions from aircraft within a predetermined range of interest—10 miles, for example—are monitored. While this method of avoiding system saturation may work in some environments, in others it is less than effective. For example, in mountainous terrain it is often difficult to judge the distance that a transmitted signal will travel based solely on the strength of the transmission signal. This reduces the reliability of Fraughton et al.-type anti-collision systems as aircraft fail to monitor other aircraft in nearby airspace. As a result, there exists a need for a TCAS system that, while using GPS navigation signals, exhibits an improved method of avoiding system saturation.

SUMMARY OF THE INVENTION

In accordance with this invention a system for coding and transmitting traffic alert and collision avoidance data between vehicles traveling within a given airspace is provided. While the invention was designed for use with aircraft traveling in three-dimensional airspace, the invention is potentially usable with other types of vehicles, such as land vehicles and boats traveling in a space having essentially two dimensions. The airspace volume, (or earth surface area) is divided into a gridwork of volume elements, each of which is assigned a unique nonmaximal-length pseudonoise (PN) code. The pseudonoise codes are selected so that all undesired maxima in each autocorrelation function fall below a predetermined, (and small) upper bound. Aircraft operating within the airspace partitioned into volume elements are equipped with TCAS transmitters. Each transmitter contains a GPS receiver to determine the aircraft's precise position based on navigation signals from GPS satellites. After an aircraft determines its location, the TCAS transmitter performs two functions. It calculates the PN code of the volume element through which the aircraft is currently flying. The TCAS transmitter also constructs a navigation message that contains the aircraft's latitude, longitude, and altitude (sometimes called the aircraft's navigation solution), plus other miscellaneous information if desired. The navigation message and the PN code representing the volume element containing the aircraft modulate a carrier signal that is transmitted by the aircraft's beacon antennas. The composite signal, comprising the navigation message superimposed on the airspace code, is hereinafter referred to as the collision avoidance signal.

The collision avoidance signal is transmitted by the TCAS transmitter at intervals based on a binary maximal-length pseudorandom sequence. When the pseudorandom sequence is high, the collision avoidance signal is transmitted. When the pseudorandom sequence is low, the collision avoidance signal is not transmitted. During non-transmission intervals, if the aircraft is equipped with an optional TCAS receiver, the aircraft's beacon antennas are used to receive collision avoidance signals from other aircraft. The use of a pseudorandom sequence to control the transmission/reception of collision avoidance signals eliminates the process of interrogation currently used in commercial TCAS. The pseudorandom sequence is selected so that interference between aircraft transmissions is acceptably low.

In accordance with further aspects of this invention, all aircraft operating within the airspace are ideally equipped with TCAS transmitters to alert others of their location. Many of the aircraft are also equipped with an optional TCAS receiver. Each TCAS receiver searches for received codes corresponding to common and surrounding volume elements. In order to determine which collision avoidance signals represent potential collision threats, a receiving aircraft first determines its own location based on signals from GPS satellites. Once it establishes its location, the receiving aircraft determines the PN code for the volume element in which it is flying, as well as the PN codes for the surrounding volume elements. This set of PN codes defines the range of volume elements that are searched for other aircraft. Due to the size of the volume elements, only aircraft operating in the same or surrounding volume elements pose a risk of collision. Aircraft operating outside of these volume elements can be safely ignored.

Once the set of PN codes representing the volume elements to be searched has been identified, the TCAS receiver searches for collision avoidance signals from aircraft operating in the set of volume elements identified by the codes. The signal received by a TCAS receiver is a composite comprising overlapping messages and additive noise. The receiver measures the correlation between the received signal and the set of pseudonoise codes that are being searched, and assigns to a synchronized tracking channel each received signal for which a correlation maximum exceeding a predetermined threshold has been found. The navigation message data is decoded by each tracking channel to determine the positions of the other aircraft. In this manner, only the location of those aircraft that are operating in the same or surrounding volume elements as the receiving aircraft are monitored to see if they pose a potential collision threat.

Based on the decoded navigation message, the receiving aircraft can calculate the estimated course of the aircraft in the same or surrounding volume elements. If the estimated courses appear to pose a danger to the receiving aircraft, visual or auditory warnings are provided to the pilot to warn of the impending danger. Depending upon the complexity of the TCAS receiver, resolution advisories may also be provided to the pilot to recommend courses of action that can be taken to avoid a collision.

In accordance with other aspects of this invention, the TCAS receiver calculates the range and range rate of each aircraft being tracked. Monitoring the range and range rate allows the receiving aircraft to predict the course of an aircraft in the event that an aircraft's signal is lost, or if the aircraft's signal interferes with another aircraft's signal because they are approximately the same distance from the receiving aircraft. By computing the path of an aircraft that has been temporarily lost by a tracking channel, rapid re-acquisition of code synchronization is possible. In addition, maintaining a tracking channel assignment through a temporary signal loss prevents unnecessary re-shuffling of tracking channel assignments.

An advantage of the disclosed system is that it provides an effective technique for minimizing conflicts between collision avoidance signals transmitted from multiple aircraft sharing the same airspace. Code diversity allows multiple aircraft to transmit their collision avoidance signals on the same channel and allows receiving aircraft to recognize collision avoidance signals only from those aircraft that are close enough to pose a potential collision threat.

Another advantage of the disclosed system is that a common frequency is used for all collision avoidance signals. This conserves radio spectrum as well as simplifying the design and operation of the transmitters and receivers. As described below, the specific common frequency proposed for use in an illustrated embodiment of the invention nicely fits within the frequency spectrum currently allocated to aircraft communications.

A further advantage of the disclosed system is that it does not require interrogation by other aircraft before a collision avoidance signal is transmitted. Instead, collision avoidance signals are continuously transmitted by all aircraft based on a pseudorandom sequence. This allows time-division multiplexing to be used to access a common channel.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
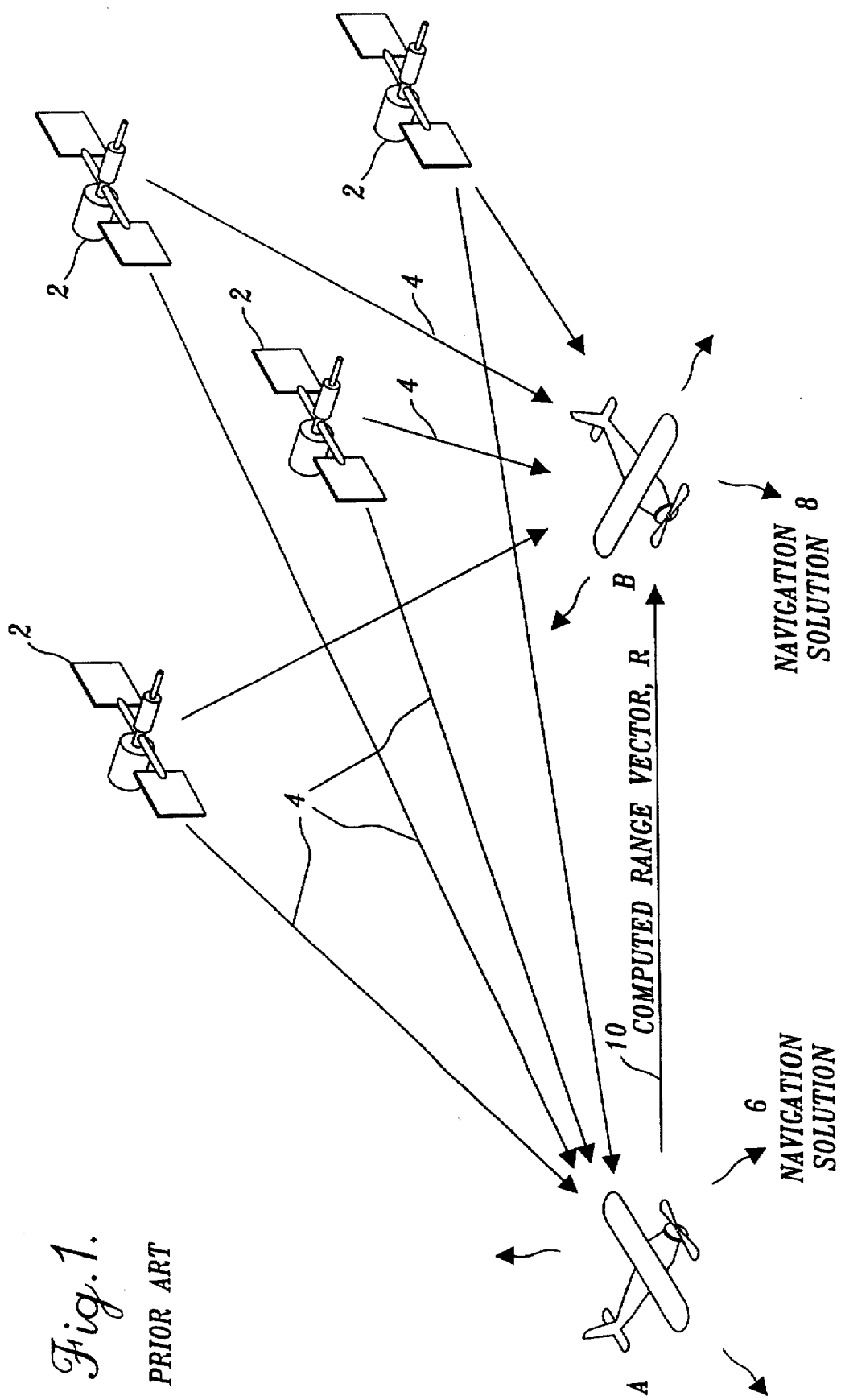
FIG. 1 is a pictorial view depicting a prior art system for determining aircraft position based on signals from Global Positioning System (GPS) satellites and transmitting position information from one aircraft to another in order for the other aircraft to compute a range vector between the aircraft.
Figure 2:
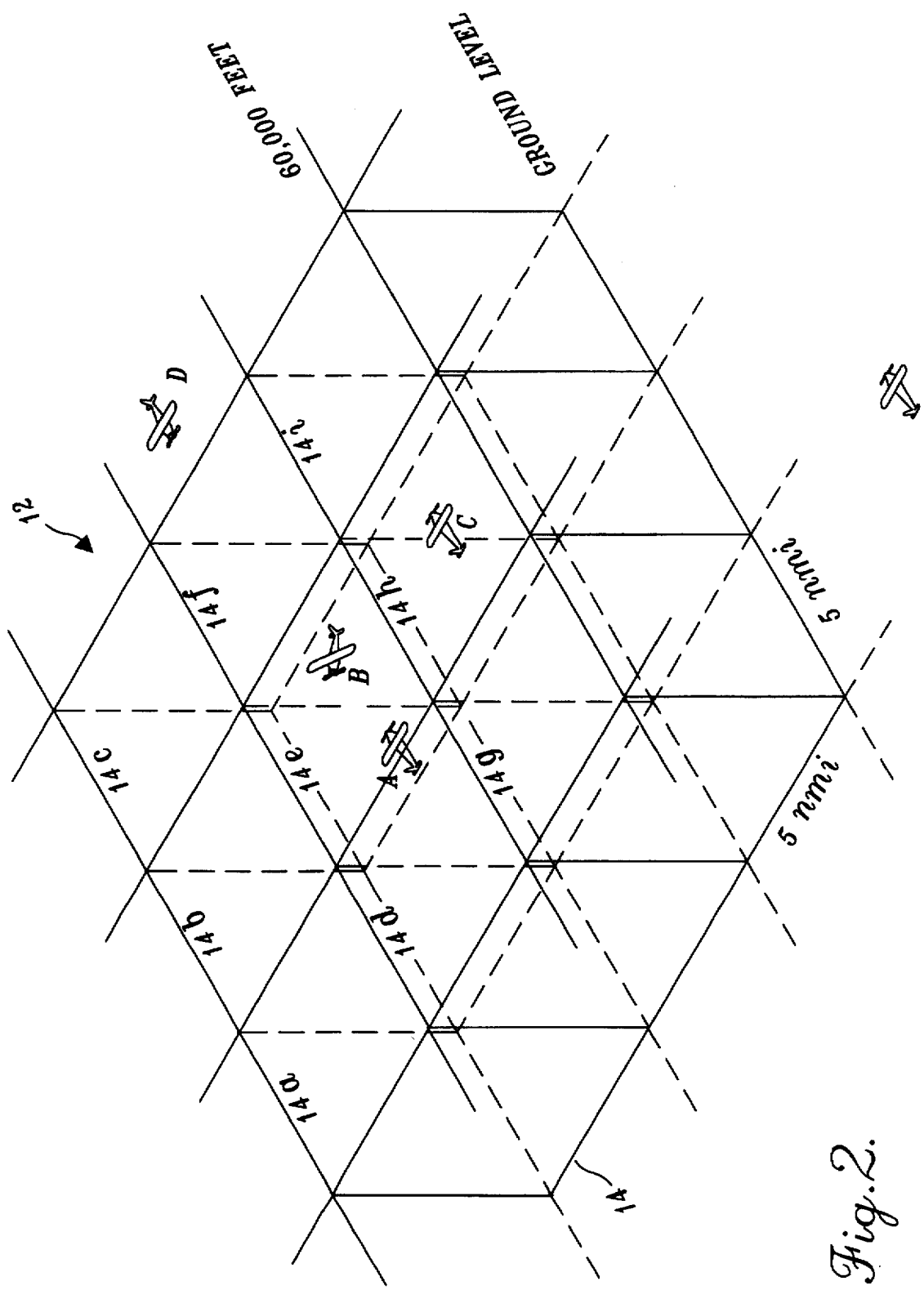
FIG. 2 is a pictorial view of four aircraft operating in an airspace that has been partitioned into a series of volume elements according to the present invention.

In order to avoid system saturation problems inherent in prior art systems, the present invention incorporates a method for encoding the airspace surrounding an aircraft to reduce the number of signals that must be monitored and tracked by a receiving aircraft at any given time. FIG. 2 is a pictorial diagram of a preferred embodiment of the encoding scheme. In any given area, a region of airspace 12 containing several aircraft can be divided into a set of volume elements 14. In the presently preferred embodiment of the invention, the airspace is divided into a set of volume elements that are approximately five nautical miles (nmi) on a side (at ground level), and extend from ground level up to 60,000 feet. In FIG. 2, the portion of the airspace containing aircraft A, B, and C has been divided into a set of nine volume elements 14a, 14b, . . . 14i. Each volume element is the same size, and each is located flush with its neighbor so that no gaps exist between adjacent volume elements. Note that FIG. 2 shows only the region of the airspace 12 surrounding aircraft A that has been partitioned into volume elements. The partitioning of the airspace extends well beyond the subdivided area shown in FIG. 2. In a fully implemented system, the subdivided area would cover the entire surface of the earth, when an appropriate mapping technique is used. For example, the volume elements may be mapped onto the globe along lines of longitude so that at the equator, each volume element is approximately 5 nmi square. If this mapping technique were used, the volume elements would become progressively narrower near the poles. Those skilled in the art will recognize that alternate mapping schemes exist for mapping volume elements onto the surface of the earth.

As will be better understood from the following description, each volume element 14a, 14b, ... 14i of the divided airspace 12 is assigned a unique code that is used to modulate a carrier signal. The unique code assigned to each volume element is based on the location of the volume element on the earth. Under this encoding scheme, two aircraft flying through the same volume element will transmit the same volume element code. Thus, aircraft A and aircraft B, which are shown as both flying through the same volume element 14e in FIG. 2, will transmit the same unique volume element code. As also described more fully below, in addition to the unique code, the carrier signal is modulated by a navigation message that describes the actual location (latitude, longitude and altitude) of the aircraft transmitting the carrier signal.

As just noted, aircraft flying through the region of airspace 12 shown in FIG. 2 continuously determine their current position and, based on their position, also determine the unique code of the volume element through which they are flying. The current position of each aircraft is determined using signals received from Global Positioning System (GPS) satellites. In addition to allowing the aircraft to accurately determine its position (latitude, longitude, and altitude), the GPS signals allow the aircraft to determine the volume element in which the aircraft is flying. Based on its position, each aircraft generates and continuously transmits a collision avoidance signal comprising a navigation message describing the precise location of the aircraft, superimposed upon a unique code determined by the volume element in which the aircraft is flying. That is, the collision avoidance signal includes data about both the aircraft's GPS-determined position and the volume element in which the aircraft is currently located.

By transmitting both a navigation message and a code representing the volume element containing an aircraft, the number of aircraft emitting collision avoidance signals that must be monitored by a TCAS receiver equipped aircraft is reduced. An aircraft in a given volume element need search for correlation maxima in the ensemble of received signals using only those codes representing common and surrounding volume elements. For example, in FIG. 2, aircraft A would only need to search for and maintain synchronism with codes generated by aircraft in volume elements 14a, 14b, ... 14i. Signals from aircraft that are flying in volume elements outside of those surrounding the volume element in which aircraft A is flying, if received, would not have to be monitored because they are too far away to create a collision threat. Under the proposed encoding scheme, aircraft A would therefore acquire and track the collision navigation signals that originate from aircraft B and from aircraft C. In contrast, a collision avoidance signal broadcast by aircraft D, if received by aircraft A, would be ignored until aircraft D enters a volume element surrounding the volume element in which aircraft A is flying. This reduces the number of signals that aircraft A must process, and ensures that only those aircraft that potentially might present a collision threat to aircraft A are acquired and tracked.

A further advantage of transmitting a message containing a code representing the volume element containing the transmitting aircraft is that it allows multiple aircraft to transmit signals using the same carrier frequency. The use of code diversity rather than frequency diversity conserves the radio spectrum. Those skilled in the art will recognize that the method employed by the invention as described below relies on a Code Division Multiple Access (CDMA) technique to permit multiple access on a single carrier frequency. In such a system, any two or more subscribers using a common carrier frequency establish communication by using a unique access code. A subscriber transmits information superimposed upon a carrier modulated by the access code. A subscriber receiving the information synchronizes to the code by measuring the correlation between the ensemble of received signals and a copy of the common access code stored in the receiver. When a correlation maximum is found the synchronization search process is halted, and the received signal is tracked in time synchronization with the correlation maximum. The success of such a system depends in part upon having codes exhibiting low mutual cross correlation maxima. The creation of an appropriate set of codes for use in the present invention is discussed below.

I. Transmission

Figure 3:
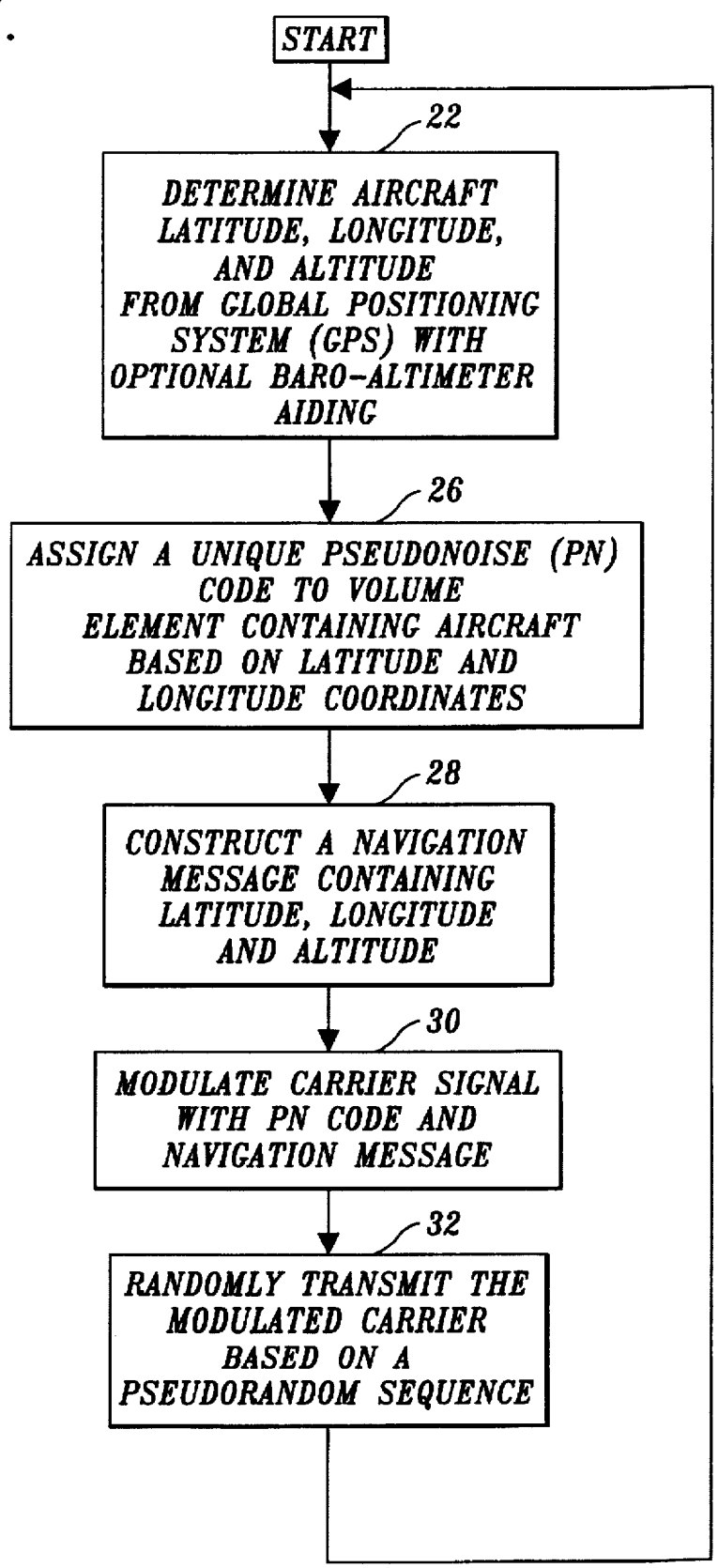
FIG. 3 is a flow chart of a transmit sequence suitable for controlling a transmitter for transmitting the location of a vehicle in accordance with the present invention.

The previous description has broadly described the method employed by the invention to code the airspace surrounding an aircraft to create a simplified TCAS. The presently preferred way of implementing the method is next discussed. FIG. 3 is a flow chart of the preferred transmit sequence implemented by TCAS transmitters located on each aircraft in a TCAS formed in accordance with the invention. At block 22, the aircraft determines latitude, longitude, and altitude using an integrated GPS navigation receiver. Because the altitude solution accuracy for the NAVSTAR GPS civil navigation service in the presence of Selective Availability is typically not as good as the precision obtainable from a barometric altimeter, the common practice is to include optional barometric altimeter aiding in the navigation solution. Such aiding generally improves the quality of the total navigation solution. A further advantage of barometric altitude aiding is realized in times when as few as three GPS satellites can be tracked by the navigation receiver. In this condition a complete three-dimensional navigation solution can still be obtained.

At block 26, the TCAS transmitter assigns a unique nonmaximal-length pseudonoise (PN) code to the volume element containing the aircraft. The location of the volume element is based on a regular grid system that has been pre-configured, using an appropriate mapping technique, to cover the portion of the earth's surface where the TCAS system is operational. The PN code assigned to each volume element is likewise preselected. Two aircraft flying in the same volume element will therefore transmit the same PN code. An aircraft determines in which volume element it is operating based on the latitude and longitude determined from the GPS signals.

At block 28, the TCAS transmitter constructs a navigation message containing the latitude, longitude, and altitude (sometimes called the navigation solution) as determined by the GPS receiver with optional barometric altimeter aiding. At block 30, a carrier signal is binary-phase-modulated by the modulo-two sum of the navigation message and the PN code corresponding to the volume element occupied by the transmitting aircraft. The composite phase-modulated carrier comprises the collision avoidance signal. At block 32, the modulated carrier signal (i.e., the collision avoidance signal) is randomly transmitted based on a maximal-length pseudorandom sequence. The TCAS transmitter then returns to block 22 where the aircraft's latitude, longitude, and altitude are updated by the GPS navigation receiver.

Figure 4:
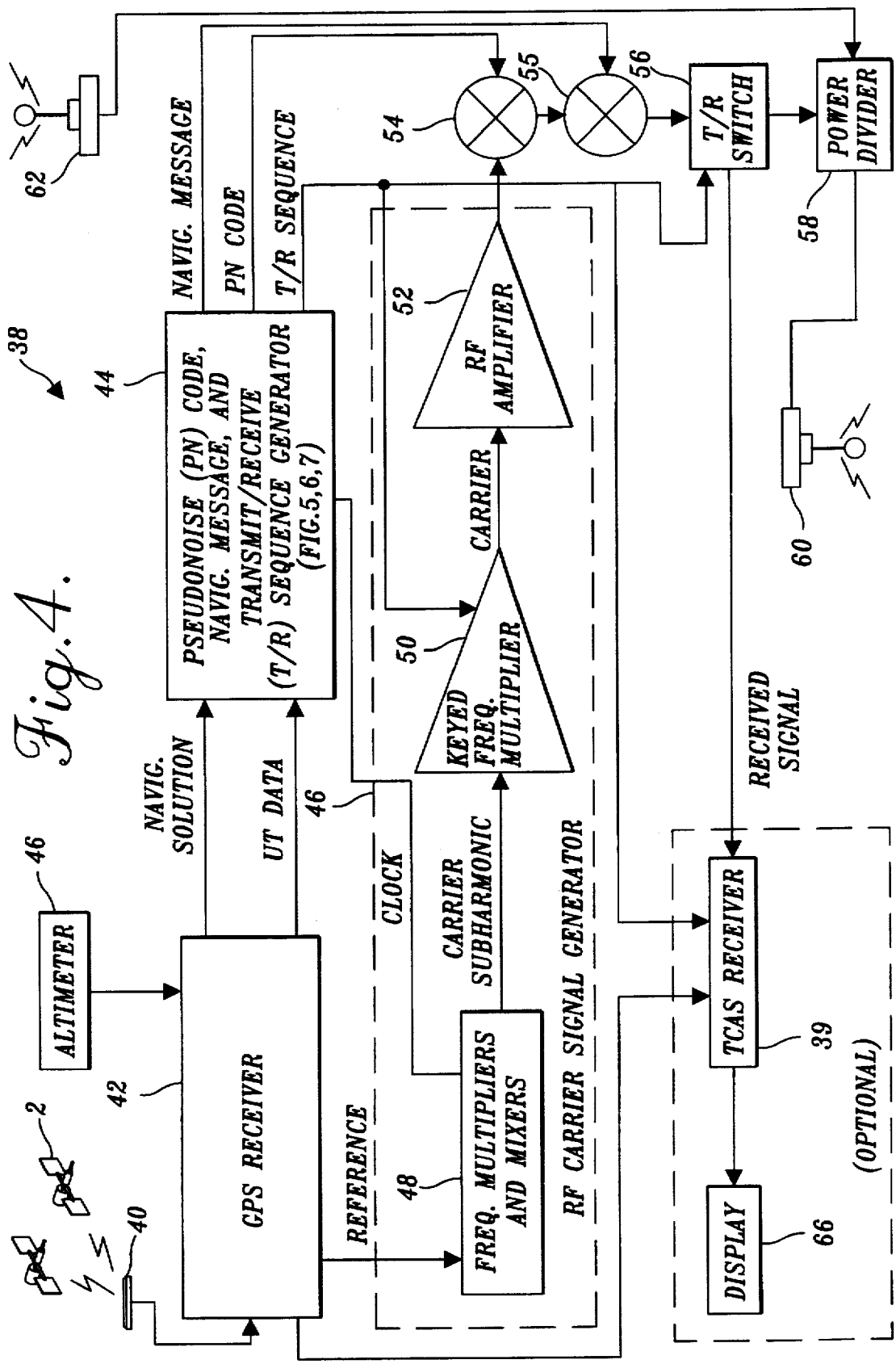
FIG. 4 is a block diagram of a TCAS transmitter and optional receiver formed in accordance with the invention.

FIG. 4 is a block diagram of a TCAS transmitter 38 formed in accordance with the invention for constructing and transmitting a collision avoidance signal according to the disclosed method. FIG. 4 also includes an optional TCAS receiver 39. The TCAS transmitter 38 receives signals transmitted from Global Positioning Satellites 2 via a GPS antenna 40. Based on the GPS satellite signals, a GPS receiver 42 determines the precise latitude, longitude and altitude (i.e., the navigation solution) of the aircraft. An optional altimeter 46 provides a barometric altitude measurement input to the GPS navigation receiver for improving the navigation solution. GPS receivers are well known in the art. Currently, commercial systems can determine the location of the receiver to within 100 meters, while military systems can resolve position with a 15 meter accuracy.

In addition to determining the position of the aircraft, the GPS receiver 42 also provides a suitable reference frequency signal (preferrably 10.23 MHz), phase coherent with the GPS RF carrier and clock rates of 1.023 MHz and 10.23 MHz. The reference frequency is used to generate the RF carrier and PN code clock frequencies for the TCAS transmitter and optional receiver. In addition, the GPS navigation receiver provides GPS Universal Time (UT) data to the TCAS transmitter PN code generation circuitry, and the optional TCAS receiver synchronizing circuits. The UT data is used to initialize the PN code generation registers. Thus, the timing for all TCAS transmitters implementing the disclosed method is based on the same stable reference frequency and time code derived from the GPS signals. Because all TCAS transmitter codes are synchronized, the number of code chips that must be searched during the receiver synchronization process is reduced.

The navigation solution, UT data, and a clock signal are input into a pseudonoise (PN) code, navigation message, and transmit/receive (T/R) sequence generator 44. The clock signal is derived from and is phase coherent with the reference frequency signal.

The PN code, navigation message, and T/R sequence generator 44 performs three functions. First, it uses the latitude, longitude, and altitude data generated by the GPS receiver to determine the PN code related to the volume element through which the aircraft is currently flying. Second, the PN code, navigation message, and T/R sequence generator 44 formats the navigation solution creating a navigation message. Finally, the PN code, navigation message, and T/R sequence generator 44 generates a pseudorandom sequence that is used to switch the TCAS transmitter 38 and TCAS receiver 39 between transmission and reception. Each of these functions is discussed below.

Figure 5:
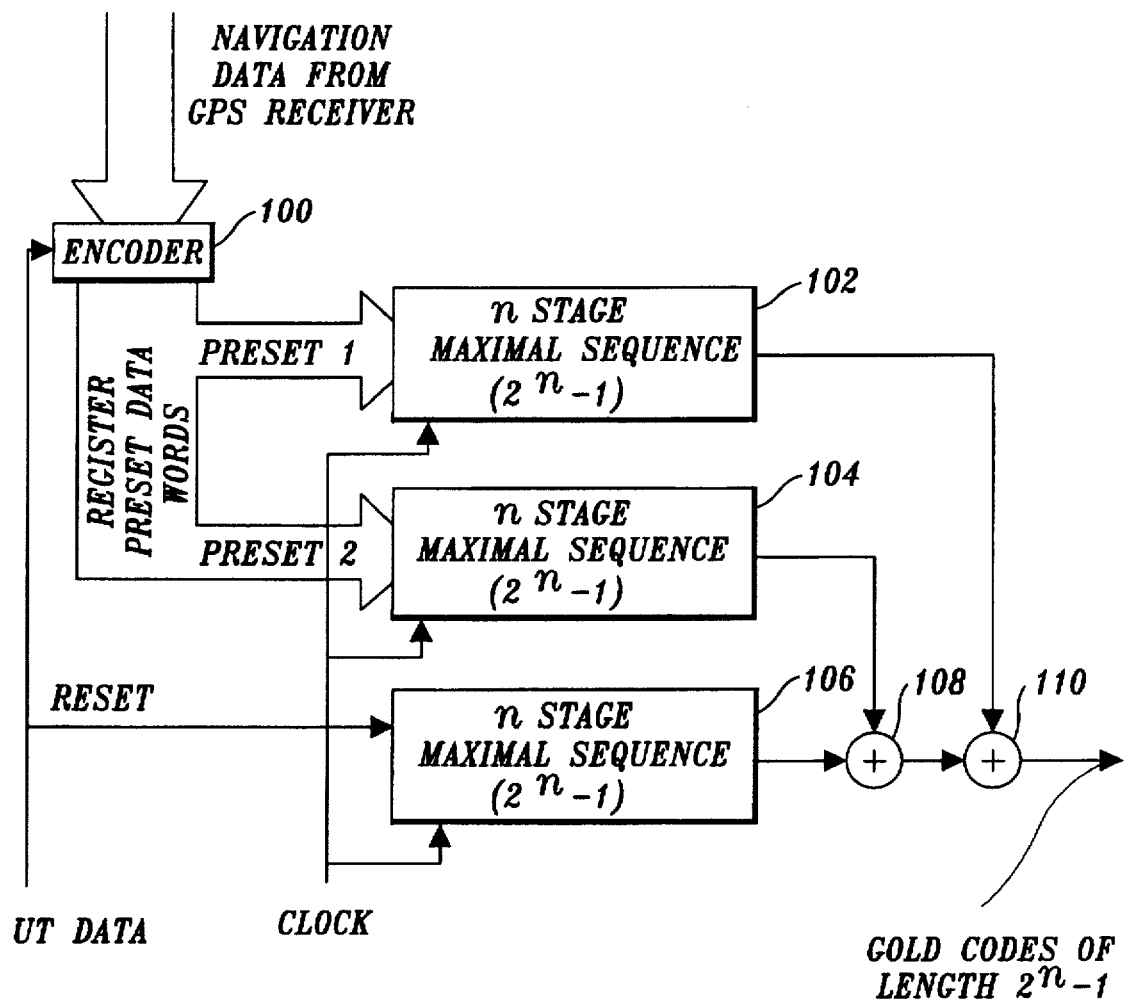
FIG. 5 is a block diagram of a pseudonoise generator suitable for determining and generating the pseudonoise (PN) code assigned to the volume elements of partitioned airspace.

FIG. 5 is a block diagram of a pseudonoise sequence generator suitable for generating the nonmaximal-length pseudonoise (PN) code that describes the volume element in which the aircraft is flying. In this regard, preferably the PN code that is generated by the PN code, navigation message, and T/R sequence generator 44 is a Gold code. To generate a Gold code for each volume element, the latitude and longitude portion of the navigation solution produced by the GPS receiver is input into an encoder 100. The encoder 100 generates two preset data words that are determined by the volume element within which the latitude and longitude places the aircraft. Each data word is applied to the preset input of linear feedback shift registers 102 and 104 by the UT data reference strobe. In addition, the UT data is applied to the reset input of a third linear feedback shift register 106. Each linear shift register is clocked at the same rate, in synchronism with the GPS reference frequency. Each n-stage linear feedback shift register generates an m-sequence of length $2^n-1$. In the presently preferred embodiment of the invention, each linear feedback shift register has ten stages (n=10), generating a sequence that is 1023 chips in length. The outputs from the linear shift registers 102, 104, and 106 are then exclusive ORed together using a pair of modulo-2 adders 108 and 110 to produce a Gold code having a sequence length of 1023 chips. Generating Gold codes using linear feedback shift registers is well known in the art. For example, see Mowbray and Grant, *Wideband Coding for Uncoordinated Multiple Access Communication*, Electronics and Communication Engineering Journal, Dec., 1992, at 351.

The pseudonoise sequence generator of FIG. 5 generates a unique Gold code for each volume element. The number of Gold codes that must be generated will depend on the area of the earth to be encoded, the horizontal dimensions of each volume element, and the method employed for encoding altitude. In the preferred method of encoding volume elements, the Gold codes for the volume elements are reused when the transmitting and receiving aircraft are sufficiently separated. Specifically, the invention contemplates that Gold codes for volume elements decoupled by the radio horizon may be reused. The radio range to the radio horizon for an aircraft flying at altitude H can be approximated by the equation:

$$D = \frac{1}{6076} \sqrt{2 * r * H} \qquad (1)$$

r=is the effective earth radius (assuming K=4/3, r=27.8487×10⁶ feet).

H=the upper bound of Class A airspace (H=60,000 feet). With these approximations, D is about 300 nautical miles (nmi). This radio range extends on either side of the aircraft, making the total radio range covered by an aircraft transmitter approximately 600 nautical miles. Using this computed radio range allows the set of Gold codes to be repeated every 600 nautical miles without conflict. The number of Gold codes that must be generated to code this area is therefore dependent upon the number and size of the volume elements.

In the embodiment of the invention being described, the volume elements are coded without reference to the altitude of the aircraft. Referring back to FIG. 2, each volume element 14 is approximately 5 nmi×5 nmi×60,000 feet. If the 600 nmi airspace is divided into volume elements of this dimension, 14,400 Gold codes are required to code the entire 600 nmi by 600 nmi of airspace. ([600 nmi/5 nmi] * [600 nmi/5 nmi]=14,400.)

Returning to FIG. 5, the encoder 100 contains a look-up table that uses the latitude and longitude data contained in the navigation solution produced by the GPS receiver to generate a pair of data words that correspond to a particular Gold code. Each pair of Gold codes must exhibit a cross correlation function having acceptably low minor correlation peaks. A procedure for selecting Gold code sets having bounded and uniform cross correlation maxima is well known in the art. See, e.g., Robert Dixon, Spread Spectrum Systems, (2d ed. 1984). It is possible to generate a maximum of 1,046,530 unique Gold codes with the fixed register feedback configuration shown in FIG. 5 (when n=10). As noted above, however, the specific embodiment of the invention requires only 14,400 Gold codes to cover the 600 nmi by 600 nmi airspace of interest. The available code space is therefore more than adequate to provide the necessary number of codes, and to provide for custom selection of codes if desired. The preset data words that cause these selected codes to be generated are stored in a look-up table that forms part of the encoder 100. Preselecting the Gold codes allows an optimum airspace coding to be achieved.

Returning to FIG. 4, the second function of the PN code, navigation message, and T/R sequence generator 44 is to convert the navigation solution into a navigation message. That is, the PN code, navigation message, and T/R sequence generator converts the latitude, longitude, and altitude information generated by the GPS receiver 42 into a navigation message format. The formatted signal therefore contains data that defines the location of the transmitting aircraft.

The third function of the PN code, navigation message, and T/R sequence generator 44 is to generate a transmit and receive sequence. The transmit and receive sequence switches the operation of the TCAS transmitter on-and-off. Preferably, the transmit and receive sequence is a maximal-length pseudorandom binary sequence whose length, again preferably, is $2^{17}-1=131,071$ bits. When the transmit and receive sequence is high, the system is in transmit mode and the collision avoidance signal is transmitted to other aircraft in the vicinity. When the transmit and receive sequence is low, the system is in receive mode, allowing the transmitting aircraft to receive collision avoidance signals from other aircraft if the TCAS equipment on the transmitting aircraft is equipped with a TCAS receiver. Using a random transmit and receive pattern keeps the transmitter duty cycle high, without the need for a complex "listen-before-transmit" time sharing procedure.

To construct a collision avoidance signal, the volume element PN code and the navigation message modulate a high frequency RF carrier signal. In accordance with the invention, as shown in FIG. 4, a carrier signal is generated by an RF carrier signal generator 46. The reference signal supplied by the GPS receiver, and having a presently preferred frequency of 10.23 MHz, is applied to a series of frequency multipliers and mixers 48. The frequency multipliers and mixers 48 produce two signals based on the reference signal. First, the frequency of the reference is doubled to produce a clock signal having a presently preferred frequency of 20.46 MHz. The clock signal is used by the PN code, navigation message, and T/R sequence generator 44 to generate Gold codes in the manner previously described.

The frequency multipliers and mixers 48 also use the reference signal to synthesize a carrier subharmonic. The carrier subharmonic is input to a keyed frequency multiplier 50 to produce a carrier signal, whose presently preferred frequency is 1063.92 MHz. The carrier frequency is phase-coherent with the presently preferred reference frequency of 10.23 MHz, and, in the presently described embodiment of the invention, is the 104th harmonic of the reference frequency. The carrier frequency was chosen because it minimizes the potential for interference with existing aircraft radar transponder equipment while maintaining the simplest possible harmonic relationship between the TCAS carrier frequency and the phase coherent GPS code and carrier frequencies. This carrier frequency is the approximate average of two frequencies commonly used in avionic applications, namely the secondary surveillance radar (SSR) interrogation frequency (1030 MHz), and the airborne transponder downlink frequency (1090 MHz). Because 90% of the power spectrum of a 1063.92 MHz carrier signal is located between these two frequencies, interference with traditional systems currently in use is minimized. In an alternate embodiment, it may be desirable to further reduce the energy within the SSR passbands at 1030 MHz and 1090 MHz. To further reduce the energy, the TCAS carrier frequency may be changed to 1060 MHz and the PN generator clock rate to either 15 MHz or 30 MHz in order to place nulls in the TCAS signal power spectrum at precisely 1030 MHz and 1090 MHz.

The on/off state of the keyed frequency multiplier is controlled by the transmit and receive sequence signal produced by the PN code, navigation message, and T/R sequence generator 44. In the presently preferred embodiment of the invention, TCAS transmitter/receiver combinations (i.e., the TCAS transceivers) are designed to transmit navigation messages and receive navigation messages from other aircraft using the same beacon antennas. When such TCAS transceivers are receiving, the transmit and receive sequence is low, whereby the keyed frequency multiplier is biased off, removing the carrier input to an RF amplifier 52. When the transmit and receive sequence is high, the keyed frequency multiplier supplies the carrier signal to the RF amplifier 52. The RF amplifier boosts the level of the signal, ensuring that adequate power is output to broadcast the signal to other aircraft. The amplified carrier frequency is then input into a modulator 54.

Modulator 54 is designed to modulate the carrier frequency with the pseudonoise code produced by the PN code, navigation message, and T/R sequence generator 44. In the presently preferred embodiment, the modulation is binary phase-shift keying (BPSK), although those skilled in the art will recognize that other types of modulation may be used, including quadrature phase-shift keying (QPSK). After the carrier signal has been modulated by the pseudonoise code, the signal is input into a second modulator 55 where the composite signal is modulated by the navigation message. In the presently preferred embodiment, the modulation is binary phase-shift keying (BPSK), although those skilled in the art will recognize that other types of modulation may be used. The carrier signal that has been modulated by the PN code and the navigation message is then input into a transmit and receive switch 56. The transmit and receive switch 56 is controlled by the transmit and receive (T/R) sequence. As discussed before, preferably a TCAS transceiver formed in accordance with the invention is configured to use the same beacon antennas for reception and transmission. When the system is transmitting, the modulated carrier signal (i.e., the collision avoidance signal) is allowed to pass thorough the transmit and receive switch to a power divider 58. The modulated carrier signal is then divided and broadcast via TCAS beacon antennas 60 and 62 that, preferably, are located on the top and bottom of the aircraft.

When the transmit and receive sequence is low, the transmit and receive switch 56 is placed in receive mode. When this occurs, signals received by the TCAS beacon antennas 60 and 62 are input into the optional TCAS receiver 39. The detailed operation of the receiver will be discussed later. Briefly, based on the collision avoidance signals received from other aircraft and the navigation solution produced by the GPS receiver 42, the TCAS receiver 39 calculates the ranges and rate of closing between the receiving aircraft and transmitting aircraft located in the volume elements being searched. The range and range rates are monitored by the TCAS receiver 39 to insure that other aircraft do not pose a threat of collision. If they do, the receiver outputs a warning of the impending collision to the user via a display 66. The display 66 may provide an auditory warning as well as a visual warning.

Figure 6:
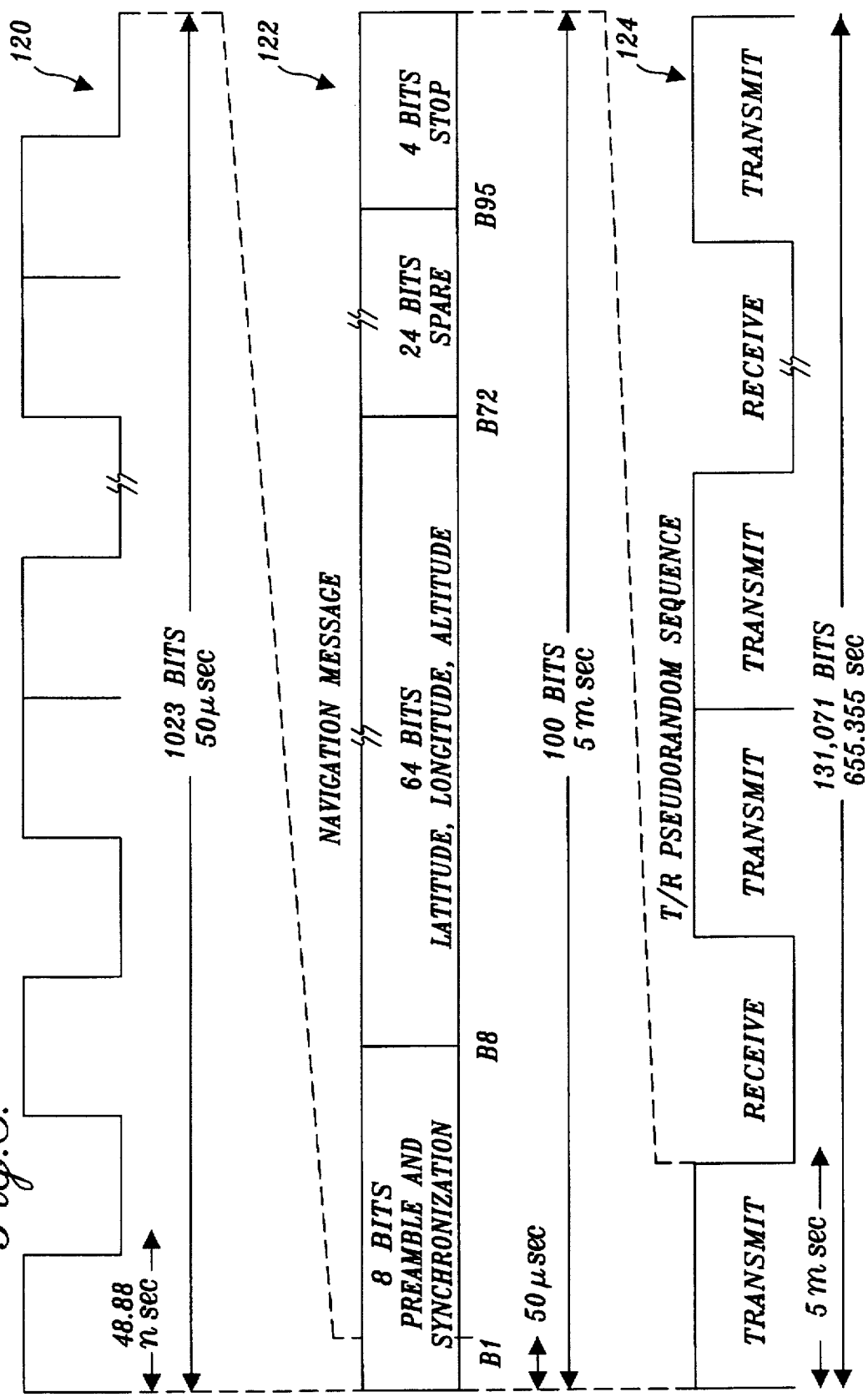
FIG. 6 is a timing diagram showing the relative timing of the components of a collision avoidance signal, including the timing of the volume element PN code, the timing of the navigation message, as well as the timing of the transmission of the collision avoidance signal in accordance with the present invention.

FIG. 6 is a timing diagram that represents the relative timing of the volume element PN code, the navigation message, and the transmit and receive sequence. Because specific numerical values make the understanding of the invention easier, the presently preferred frequency values, bit lengths, etc., are shown in FIG. 6 and are included in the following description. However, it is to be understood that other values can be used if desired. The volume element PN or Gold code 120 shown in FIG. 6 is represented by a sequence of binary digits that is 1023 chips in length. Preferably, the Gold code 120 is generated as shown in the block diagram of FIG. 5, and is output at a rate equal to twice the GPS reference frequency or 20.46 MHz. At this rate, the 1023 chip sequence takes 50 microseconds (μsec) to be completed. Each bit is 48.88 nanoseconds (nsec) in length. As discussed before, the Gold code 120 identifies the volume element through which the aircraft is currently flying.

As shown in FIG. 6, the presently preferred navigation message 122 generated by the navigation message encoder is 100 bits in length. Each bit of the navigation message is 50 μsec in duration, so that each navigation message bit is equal in length to one complete sequence of the volume element Gold code. Since each navigation message includes one hundred 50 μsec bits, each navigation message is 5 milliseconds (msec) in duration. As shown in FIG. 6, in the presently preferred embodiment of the invention the first 8 bits of the navigation message comprise preamble and synchronization bits. The next 64 bits of the message include the navigation solution as determined by the GPS satellite receiver 42 aided by the optional altimeter 46. The navigation solution defines the position of the aircraft including data describing the latitude, longitude, and altitude of the transmitting aircraft. The 24 bits following the navigation solution are currently reserved for future use in identification or error checking. When aircraft identification codes are assigned to the block of 24 bits, the TCAS beacon system can provide an Automatic Dependent Surveillance service (ADS), by supplementing or replacing existing ARTCC radar transponder systems. The last 4 bits of the navigation message are "stop" or end of message bits.

As noted above, the transmit and receive (T/R) sequence 124 shown in FIG. 6 is a pseudorandom sequence, preferably a maximal-length sequence, of 131,071 bits. Each bit of the T/R sequence 124 corresponds to the length of a complete navigation message (5 ms). An entire transmit and receive sequence is therefore 655.355 seconds in length. The purpose of the T/R sequence is to switch the beacon transmitter and receiver equipment between transmit and receive modes. For transmitting, the T/R sequence simultaneously enables the keyed frequency multiplier 50 and commutates the transmit and receive switch 56, allowing the collision avoidance signal to be transmitted over the beacon antennas. For reception, the T/R sequence disables the keyed frequency multiplier and connects the optional TCAS receiver to the beacon antennas. The pseudorandom nature of the transmit and receive sequence permits communication between multiple pairs of aircraft on a statistically determined time division multiplexed method for networking. That is, with the appropriate choice of a long pseudorandom sequence, aircraft sharing the same airspace will alternately be transmitting or receiving. By selecting an appropriate sequence, the probability that any two aircraft will always be transmitting and receiving at the same time, and thus be unable to communicate, can be made very low.

Figure 7:
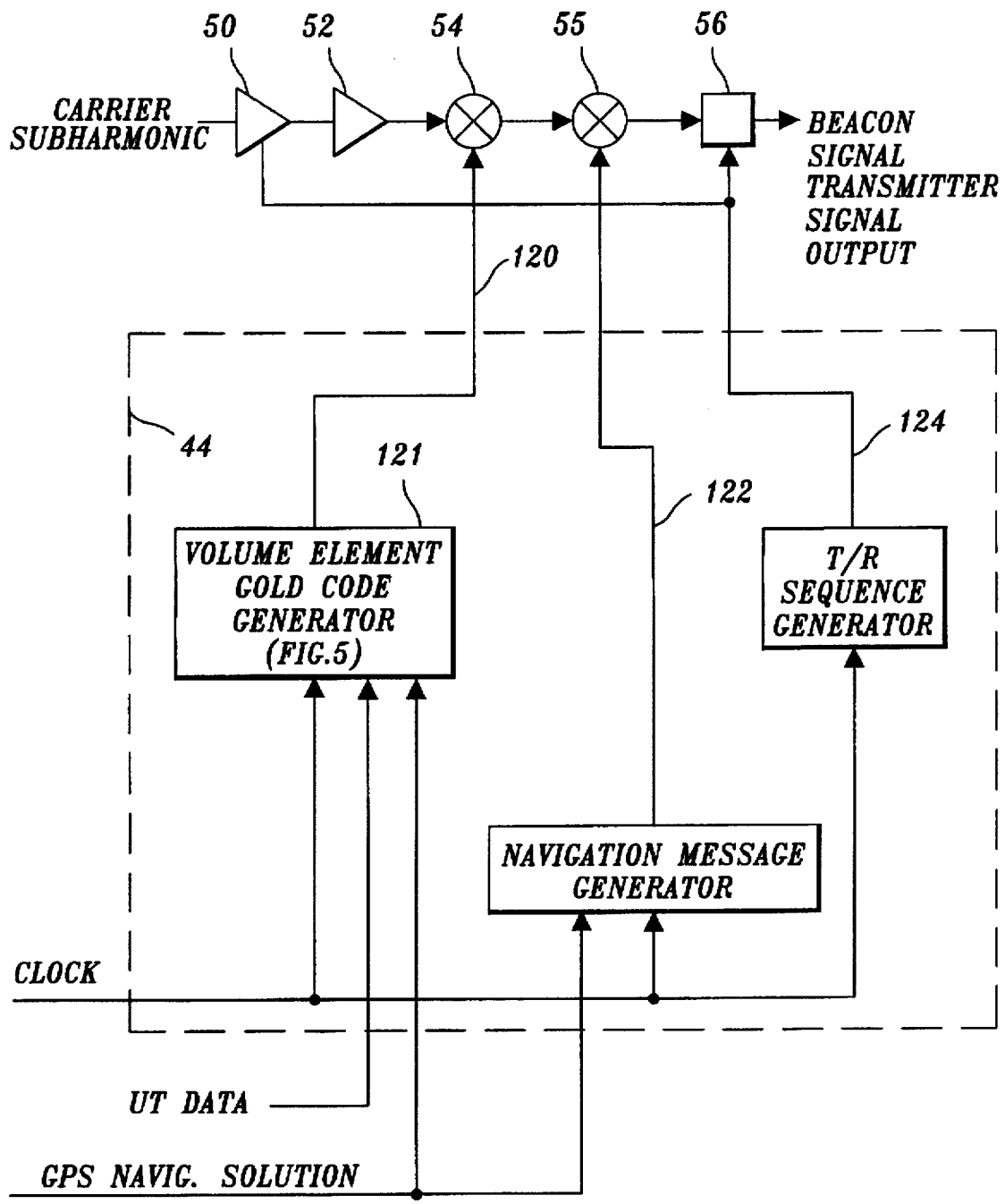
FIG. 7 is a block diagram of a modulator formed in accordance with the present invention for modulating a carrier signal with a volume element PN code, a navigation message, and a transmit/receive sequence prior to transmission.

FIG. 7 is a conceptual block diagram illustrating in more detail how the carrier signal is modulated by the volume element Gold code and navigation messages, and how the modulated carrier signal is switched by the transmit and receive sequence. The keyed frequency multiplier 50 generates a carrier signal from a carrier subharmonic and also amplitude modulates the carrier with a transmit-receive sequence 124. After amplification by the RF amplifier 52, the carrier is bi-phase modulated by a volume element Gold code 120 which is produced by a volume element Gold code generator 121 illustrated in FIG. 5 and described above. This modulation is performed by the modulator 54. The modulated carrier signal is then remodulated with a navigation message 122 by the bi-phase modulator 55. Finally, the transmit-receive sequence 124 is used to switch the TCAS beacon antennas between the transmitted collision avoidance signal and the optional receiver using the T/R switch 56. As will be appreciated by referring to FIG. 4, the volume element Gold code generator, the navigation message generator, and the T/R sequence generator are all component blocks of the PN code, navigation message, and T/R sequence generator 44. Code synchronization is provided by the GPS derived UT reference signal. It should be understood that in a practical implementation of the modulator system the two bi-phase modulators 54 and 55 would be replaced by a single phase modulator having as its modulation input the modulo-two sum of the volume element gold code 120 and the navigation message 122.

An advantage of using the transmit and receive sequence to assign transmission times to a common aircraft transmission channel is that the channel does not have to be monitored by any of the aircraft to determine when a transmission can be sent. In prior art systems, multiple transmitters operating on a single frequency channel are required to monitor the channel prior to transmission. When the channel becomes open, a waiting transmitter appropriates a free transmission time slot and broadcasts a message. (Even this monitoring process does not, by itself guarantee freedom from transmission conflicts.) In contrast, as noted above, the common channel used by the present invention does not have to be monitored. Instead, the transmitter relies on statistically determined time slots to determine when it can transmit. This eliminates the prior art need to monitor and appropriate time slots.

II. Reception

For an aircraft anti-collision system to be most effective, all aircraft must at least carry a TCAS transmitter so that all aircraft will broadcast their position to other aircraft. An advantage of the system herein described is that the limited amount of hardware required to construct a transmitter keeps total system cost low. Obviously, some, and preferably all, of the aircraft (at least those carrying a number of passengers such as commercial airlines) will also carry a TCAS receiver. A receiver is required to: (1) receive collision avoidance signals from other aircraft; (2) differentiate the signals to determine which aircraft are in the same volume element as the receiving aircraft or one of the surrounding volume elements, and thus potentially pose a risk of collision; and, (3) where appropriate, notify the pilot of the receiving aircraft of an impending collision. As briefly noted above, FIG. 4 includes an optional TCAS receiver 39 and a display 66.

Figure 8A:
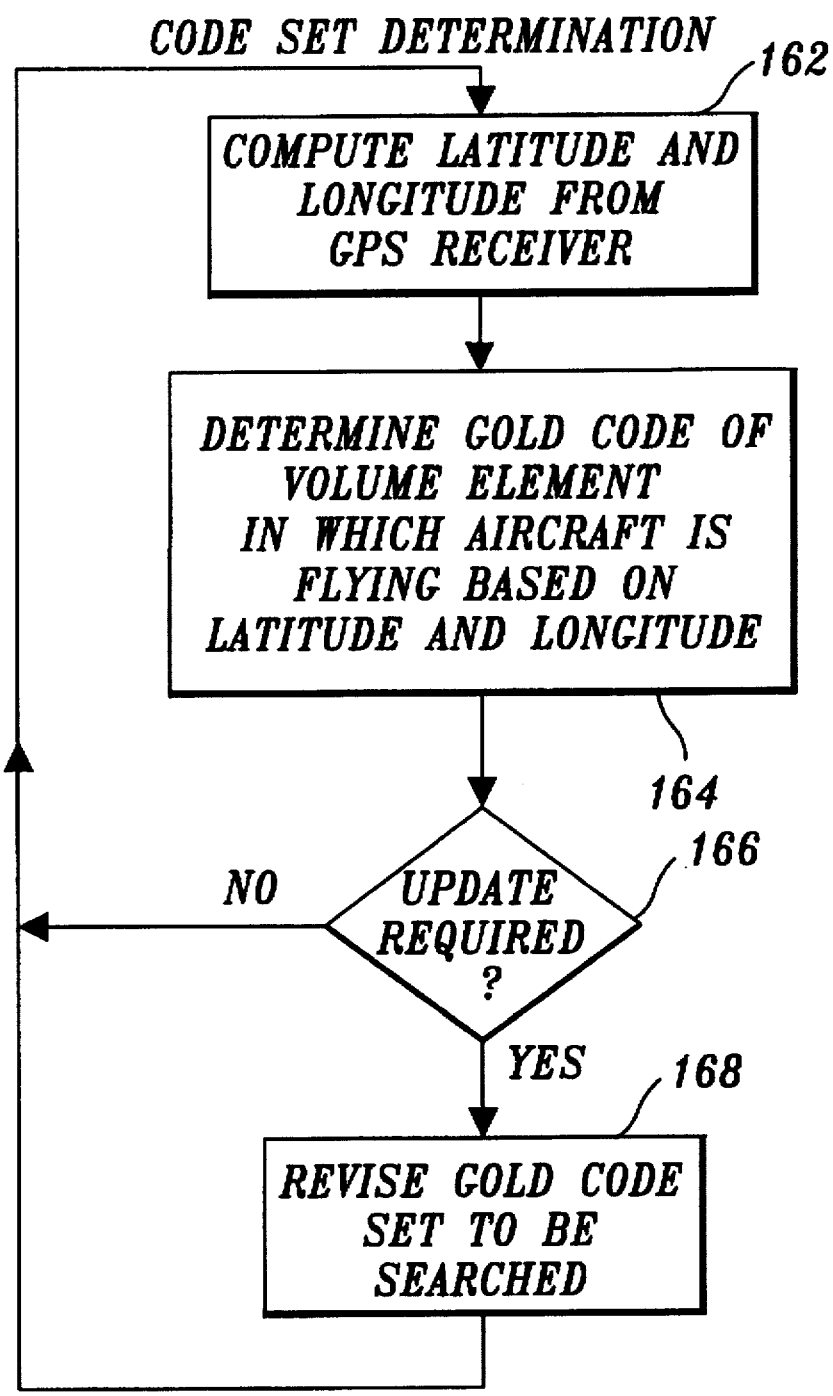
FIGS. 8A through 8C are flow charts of a receive sequence suitable for controlling a TCAS receiver formed in accordance with the invention for receiving and decoding collision avoidance signals from other vehicles in order to determine the other vehicles' position.
Figure 8B:
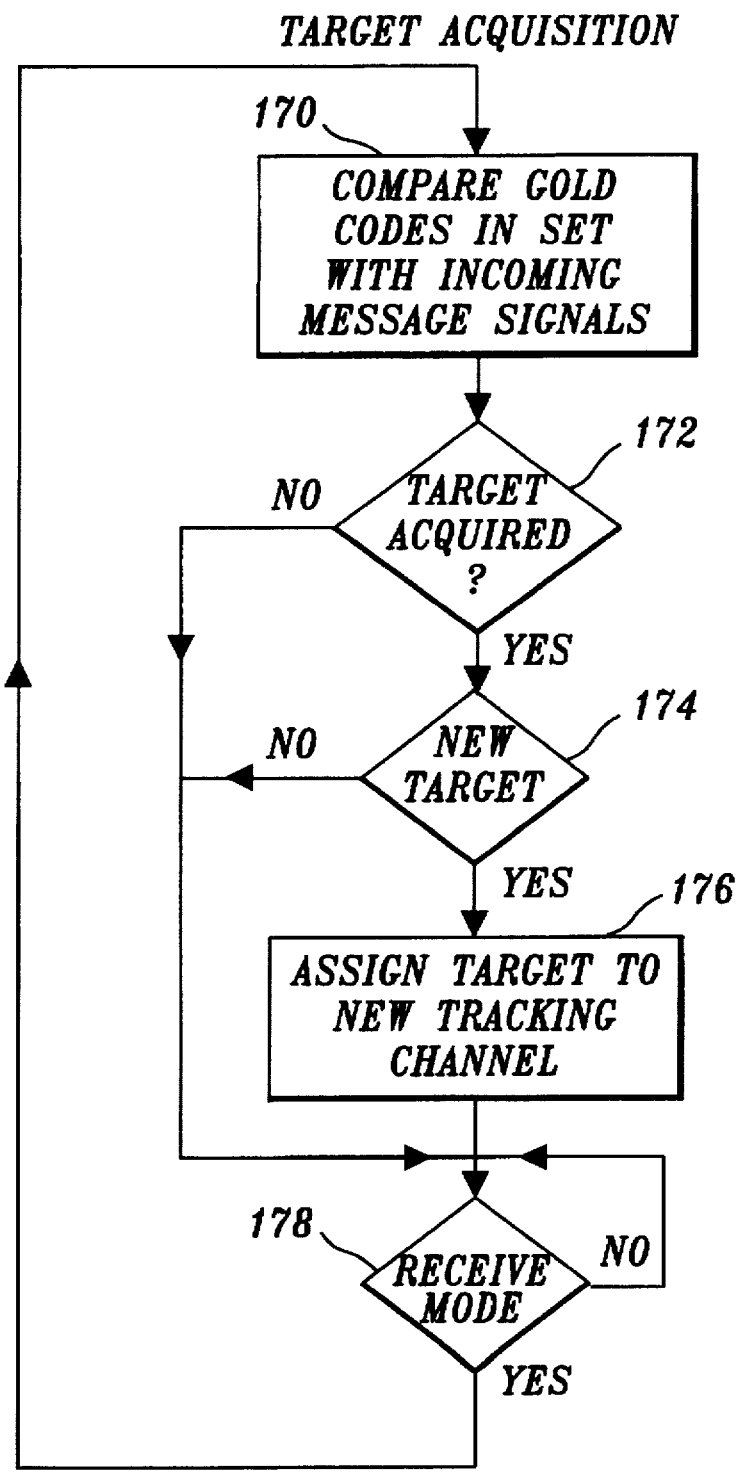
Figure 8C:
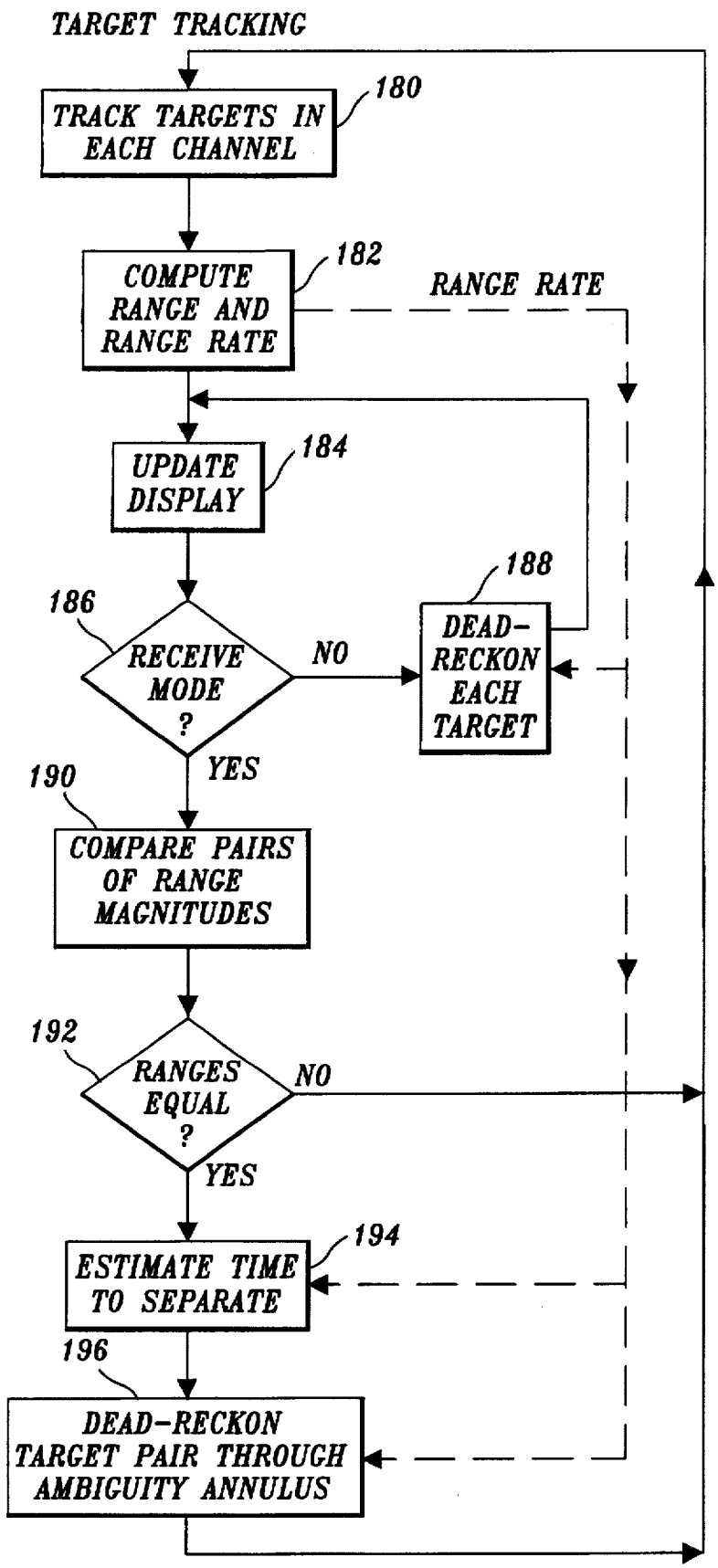

The receiving and despreading of signals that have been multiplexed on a common channel using Code Division Multiple Access techniques is well known in the art. For example, the article by Mowbray and Grant cited above includes a discussion of reception techniques. FIGS. 8A through 8C are simplified flow charts depicting the operation of the TCAS receiver 39 shown in FIG. 4. In addition to including the steps required to evaluate the navigation messages received from other aircraft, FIGS. 8A through 8C also include the steps required to create a set of Gold codes used to filter out navigation messages from aircraft beyond the volume elements of interest. That is, prior to evaluating navigation messages to determine the position of another aircraft vis-à-vis the receiving aircraft, the TCAS receiver must initially determine the set of Gold codes that must be searched to determine if a collision avoidance signal received from another aircraft contains a PN code establishing that the aircraft is in the same volume element as the receiving aircraft or in one of the surrounding volume elements. In the presently preferred mapping of the volume elements disclosed in FIG. 2, this entails determining nine different Gold codes—the Gold code relating to the volume element that contains the aircraft receiving the signal, and the eight Gold codes relating to the volume elements that surround the volume element containing the aircraft. If the volume elements were mapped using an alternate mapping scheme, the Gold code set to be searched may have greater or less than nine members. Since the Gold code assigned to each volume element is independent of the altitude of the aircraft, the Gold code set is solely based on the latitude and longitude of the aircraft.

The method of arriving at a Gold code set to be searched is a continuous process that depends upon the speed and direction of an aircraft. First, as shown in FIG. 8A, at block 162 the aircraft's latitude and longitude is determined based on signals from the Global Positioning System satellites. At block 164, this position is used to determine the Gold code of the volume element within which the aircraft is flying. Preferably, this is accomplished in the manner previously described with respect to the pseudonoise sequence generator of FIG. 5. Then a test is made to see if the aircraft has moved to a different volume element since the last iteration. See block 166. If the aircraft has not changed volume elements since the last computed position iteration, the Gold code set to be searched does not have to be updated. In this case, the TCAS receiver loops back to block 162 where the aircraft's latitude and longitude are computed. If the aircraft has changed volume elements, the program cycles to block 168 where the Gold code set is revised.

The set of Gold codes is revised by determining the Gold codes of the eight volume elements surrounding the volume element within which the aircraft is flying. This can be done in various ways. The latitude and longitude of the aircraft can be increased and decreased by plus and minus the length (l) of one side of the volume elements, e.g., approximately five nautical miles (5 nmi), creating eight related aircraft latitude and longitude "positions" (Lat+l, Long+l; Lat+l, Long; Lat+l, Long-l; Lat, Long+l; Lat, Long-l; Lat-l, Long+l; Lat-l, Long; Lat-l, Long-l). Each of the eight related aircraft positions can be then used in the manner previously described with respect to FIG. 5 to identify the Gold codes assigned to the surrounding eight volume elements. Alternatively, all of the Gold codes associated with volume elements could be stored in memory and the Gold code associated with the latitude and longitude used to "look up" the Gold codes associated with the surrounding eight volume elements.

Once the Gold code set to be searched has been determined, the TCAS receiver searches for correlation maxima between the chosen set and collision avoidance signals received from other aircraft. Signals from aircraft flying in the volume elements identified by the set of Gold codes are acquired and assigned tracking channels. A flow chart showing the method for acquiring these target aircraft is shown in FIG. 8B. The composite RF signal received by the beacon antennas of a receiving aircraft consists of the overlapping collision avoidance signals transmitted by other aircraft in the area, as well as additive noise and other interference. To despread the individual collision avoidance signals from the composite signal, the TCAS receiver sequentially compares the Gold codes making up the set with the incoming composite signal. See block 170. In digital systems, this comparison or correlation is usually done using a sliding correlator or a digital matched filter (DMF) whose construction is well known in the art. If the received carrier signal was originally modulated with the Gold code used in the correlation, the autocorrelation function exhibits a peak indicating that the signal originated from one of the volume elements being searched. An advantage of using a set of Gold codes that have been selected so that they exhibit uniformly low correlation sidelobes is that any signals originating from aircraft outside of the volume element being searched are filtered out by the correlation procedure.

As shown at block 172, the Gold code comparison or correlation process is continuously monitored to detect when an incoming collision avoidance signal has been modulated with one of the Gold codes included in the set being searched. When this occurs, a test (block 174) is made to determine if the collision avoidance signal is from a new target aircraft or relates to a previously acquired aircraft. If two or more aircraft are located in the same volume element, their autocorrelation functions will be delayed in proportion to the difference in their ranges to the receiving aircraft. This delay allows the receiver to distinguish between multiple aircraft located in a single volume element. If the aircraft are located at an equal distance, so that their signals arrive at the receiving aircraft with zero time delay, then a procedure described below is used to keep track of the equidistant aircraft.

At block 176, the receiver assigns newly identified aircraft to a tracking channel. The tracking channel monitors signals received from the target aircraft until the target aircraft is no longer in one of the volume elements being searched. At block 178, a test is made to determine if the TCAS transmitter/receiver is in the receive mode. If not, the receiver is placed in a wait loop since the TCAS beacon antennas are being used for transmission of the navigation message rather than reception from other aircraft. When the TCAS transmitter/receiver returns to the receive mode based on the transmit/receive pseudorandom sequence (shown in FIG. 6), the receiver cycles to the step of comparing Gold codes in sequence with incoming message signals (block 170).

Once signals from aircraft in the volume elements being searched have been acquired, the TCAS receiver 39 monitors the collision avoidance signal that is broadcast from each aircraft and tracks the location of the aircraft. A flow chart detailing the target tracking process is shown in FIG. 8C. At block 180, the receiver decodes the navigation solution contained in each navigation message received from a target aircraft. The navigation solution includes the latitude, the longitude, and the altitude of the aircraft transmitting the signal. Based on this information and information about the latitude, longitude and altitude of the receiving aircraft, the TCAS receiver 39 calculates the range and the rate of change in the range (i.e., the range rate) between the receiving aircraft and the target aircraft. See block 182. The positions of the target aircraft are then displayed so that the pilot of the receiving aircraft is apprised of the location of target aircraft in the volume elements being searched. See block 184. Additional information, such as warnings of potential collisions or advisories on how to avoid a collision with the other aircraft, i.e., resolution advisories (RAs), may also be displayed depending upon the complexity of the receiver. Also, the display may include an audible alarm, a visual alarm, or both for alerting the pilot of aircraft that could potentially collide with the receiving aircraft. Standard collision avoidance displays are well known in the aircraft industry, and are more fully described in the article Walsh and Wojciech, *TCAS in the 1990's*, Navigation: Journal of the Institute of Navigation, Volume 38, No. 4, Winter, 1991-92. Since methods for calculating when an aircraft poses a potential threat to a receiving aircraft are well known in the art, they are not described here.

At decision block 186, the receiver checks to see if the TCAS beacon antennas are being used for transmission of a navigation message or for reception of navigation messages from other aircraft. If in the transmit mode, the receiver uses past information to estimate the course of each target aircraft and to update the display based on the estimates. See block 188. The use of dead reckoning to estimate flight path of each target aircraft continues until the beacon antennas are returned to the receive mode.

Figure 9:
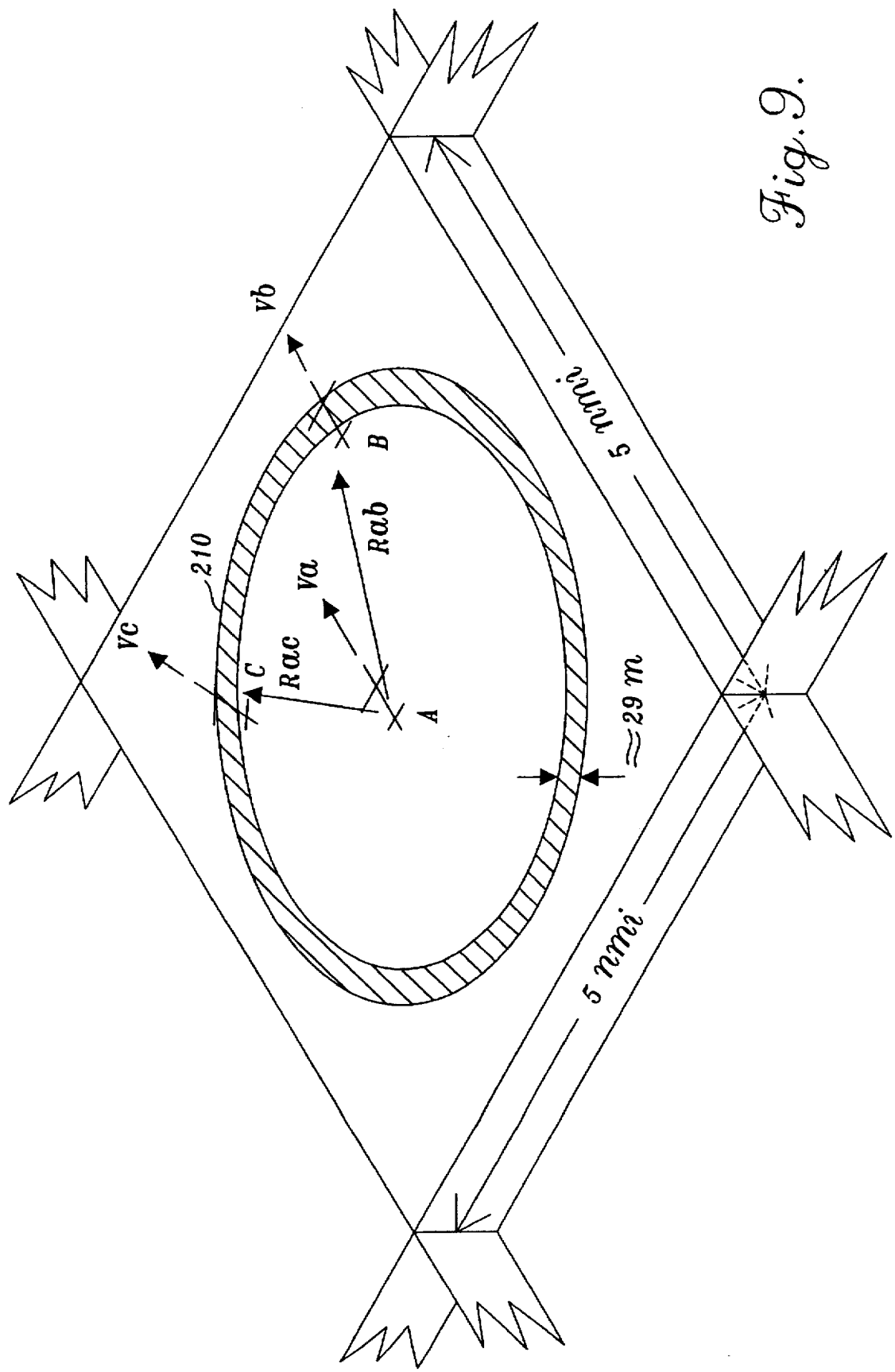
FIG. 9 is a pictorial representation of a situation when two aircraft are located an equal distance from a third aircraft, thus making it difficult to distinguish between the collision avoidance signals transmitted by the two aircraft.

When the TCAS receiver is receiving beacon signals from other aircraft, the receiver compares, in block 190, range magnitudes from each pair of those aircraft assigned tracking channels and occupying a common airspace volume element. When the range magnitudes of any two or more aircraft are nearly equal, the navigation messages from these aircraft will mutually interfere because they are transmitting identical volume element codes. During such time periods, dead-reckoning of these aircraft is required. The process is described below, and illustrated in FIG. 9. FIG. 9 shows a special case in which aircraft A, B and C occupy a common volume element and are transmitting collision avoidance signals modulated by identical Gold code sequences. Aircraft A is the receiving aircraft and aircraft B and C are equidistant from aircraft A ($R_{ab}=R_{ac}$). Since all TCAS transmitters and receiver volume element codes are synchronized to GPS time, the collision avoidance signal codes transmitted by aircraft B and aircraft C arrive at aircraft A in synchronism. When this occurs, the collision avoidance signal codes will be maximally correlated and appear to originate from a single emitter. Because it is not possible with simple correlation to separate the navigation messages in the tracking channels, information defining the positions of both aircraft is lost.

The region where this problem arises is shown in FIG. 9 as an interference annulus 210 of approximately two code chips in width. In the case of three target aircraft, a single interference annulus is defined by the common plane in which the aircraft lie. In three-dimensional space, the interference region becomes the volume between two concentric spheres whose center is located at the receiving aircraft. A code chip corresponds to one bit of the Gold code sequence. Since the Gold code is preferably generated at a clock rate of 20.46 MHz, each chip has a duration of 48.88 nanoseconds. Two chips take 97.75 nanoseconds, which corresponds to a range of approximately 29 meters. (97.75 ns * $3.0 \times 10^8$ m/s, the speed of radiation in a vacuum=29.3 meters.) Thus, the interference annulus 210 is one or more (depending on the number of target aircraft in the region) rings having a width of 29 meters that surrounds the receiving aircraft at the distance of the equidistant transmitting aircraft.

Two features are incorporated into the preferred embodiment of a TCAS receiver formed in accordance with the invention to mitigate the adverse effects caused by mutual signal interference. First, the chosen pseudonoise code generating clock frequency minimizes the duration of the signal interference period by minimizing the width of the interference annulus. Since the annulus is only 29 meters in width, two aircraft will remain within the annulus for longer than 10 seconds only if their differential velocities were matched in magnitude to within three meters per second (or about 6 knots). The probability that two aircraft on random flight paths will remain so closely matched in speed for longer than several seconds is low. Second, as shown in the flow chart of FIG. 8C (block 182), and previously described, the range and range rate of each aircraft with respect to the receiving aircraft is calculated and stored. As discussed more fully below, knowledge of the two or more interfering target aircraft velocities allows the TCAS receiver 39 to predict the length of time that the aircraft collision avoidance messages will be interfering. Range and range rate plus knowledge of the latitude, longitude, and altitude of the interfering target aircraft also allows the TCAS receiver 39 to determine the course of each interfering target aircraft, and the approximate time and location where the aircraft will leave the interference annulus. That is, because the flight path of each target aircraft is known, the receiver can predict when interfering target aircraft will enter and leave the interference annulus based on the velocity and last known position of the aircraft.

Using these two features to minimize the problems caused by interfering collision avoidance messages allows aircraft tracking to proceed without the TCAS receiver 39 having to reacquire the individual signals transmitted from each aircraft. In addition, an alarm flag can be generated if the predicted time interval resulting from mutual interference is excessive. Although FIG. 9 shows the situation where all three aircraft are operating in the same volume element, the same technique can be applied when the interfering target aircraft both occupy the same volume element that is different from the volume element within which the receiving aircraft is located, yet are at approximately the same distance from the receiving aircraft.

Returning to FIG. 8C, at a decision block 192, a test is made to determine if two or more target aircraft will enter an interference annulus, based on the range comparison (block 190). If the test is negative, the receiver loops back to block 180 and continues to track each target aircraft. If two or more target aircraft will enter an interference annulus, the receiver cycles to block 194 where an estimate of the time that the aircraft will remain in the same annulus is made. At block 196, the receiver calculates the path of each interfering target aircraft so that the display can be updated. This ensures that all target aircraft being tracked can be monitored on the display, including target aircraft whose collision avoidance signals interfere. After calculating the paths of all interfering aircraft, the receiver loops to block 180.

Figure 10:
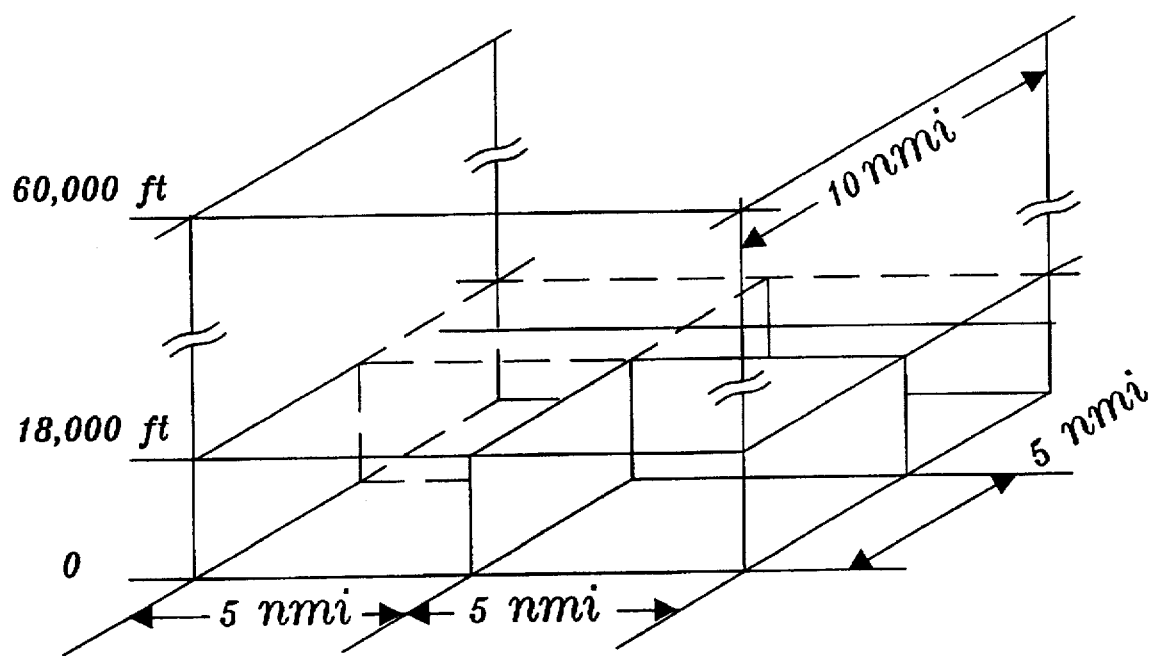
FIG. 10 is a pictorial representation of an alternative technique of encoding the airspace surrounding an aircraft formed in accordance with the invention.

While a preferred embodiment of the invention has been illustrated and described, it will be appreciated that various changes can be made therein without departing from the spirit and scope of the invention. For example, the coding of the volume elements can be changed to accommodate altitude as well as latitude and longitude. If this is done, the latitude/longitude dimensions of the higher altitude volume element can be increased to take advantage of the fact that aircraft flying at higher altitudes generally fly at higher speeds. More specifically, as shown in FIG. 10, it is possible to divide the airspace below 18,000 feet into 5 nmi square blocks as shown in FIG. 2 and described above. Above 18,000 feet, however, the airspace can be divided in 10 nmi square volume elements. Four of the smaller 5 nmi volume elements would therefore be subsumed in a single 10 nmi volume element, reducing the number of Gold codes that must be generated to code a given airspace.

Codes are saved because of the reduced number of volume elements at the higher altitudes, as well as the reduced area of the airspace that must be encoded at the lower altitudes. More specifically, as described above when volume elements extend up to 60,000 feet, a 600 nmi square area has to be coded with unique Gold codes before the Gold codes are repeated. This dimension arises because 600 nmi is twice the approximate distance to the radio horizon from an aircraft flying at 60,000 feet. If 5 nmi square blocks are chosen, as shown above, 14,400 Gold codes having favorable correlation properties must be generated in order to cover the 600 nmi square grid. In contrast, the alternate encoding scheme disclosed in FIG. 10 reduces the required number of Gold codes to 7956. At the lower altitude level, 18,000 feet, twice the distance between an aircraft and the radio horizon is approximately 330 nmi. (As a general rule, transmissions from aircraft below the radio horizon will not be received.) Thus, the total number of codes required below 18,000 feet is only 4356 Gold codes. [(330 nmi/5 nmi) * (330 nmi/5 nmi)=4356.] For the set of codes between 18,000 and 60,000 feet, the 600 nautical mile radio range limit still applies, but the number of codes is reduced since each volume element is 10 nmi square. The higher altitude set requires selecting 3600 Gold codes with favorable correlation. [(600 nmi/10 nmi) * (600 nmi/10 nmi)=3600.] The sum of the codes needed at the lower altitude (4356) and upper altitude (3600) therefore represents a substantial savings in the number of codes required over the first coding scheme described above. Obviously other coding schemes that reduce or expand the number of codes required are also possible.

As will be recognized by those skilled in the art, using the alternate system of coding illustrated in FIG. 10 and described above decreases the number of codes that must be generated at the cost of introducing additional complexity into the system. In order to assign Gold codes to each volume element in the alternate encoding scheme, altitude must be used along with latitude and longitude in order to determine the appropriate Gold code for the encoding aircraft. An altitude dependent airspace encoding system would preferably employ barometric altitude aiding to improve the measured altitude accuracy. Using the alternate system of altitude encoding would also entail revising the reception scheme to include searching those volume elements that were above or below the volume element containing the receiving aircraft.

Those skilled in the art will also recognize that there are several different methods of modulating a carrier frequency with a Gold code and a navigation message. The embodiment discussed above suggests the use of binary phase shift keying (BPSK). However, it is to be understood that other modulation techniques such as quadrature phase-shift keying (QPSK), frequency-shift keying (FSK), or other modulating techniques can also be used.

It will also be obvious that other types of codes can be used to identify each volume element. Gold codes were selected because there exists a well defined procedure for selecting a large set of codes having uniform and bounded correlation sidelobes. However, similar procedures exist for choosing other codes. Kasami sequences, for example, have better cross correlation properties than Gold codes, but the set is much smaller for a given register length. JPL codes have minor correlation maxima which aid in achieving rapid synchronization. Since the codes are mapped onto the volume elements, and their correspondence to each volume element is unchanging, the set of codes used in an actual embodiment of the system should be derived and selected to exhibit the most favorable correlation properties.

It is also recognized that the position of the transmitting or receiving aircraft can be determined from one of several different types of navigational aids. Although the use of the signals from the global positioning satellites is contemplated in the current embodiment, other more traditional navigation aids can be used including OMEGA or Loran-C for marine or aeronautical applications, and VORTAC, or VOR/DME for aeronautical applications. Although each of these navigational systems use a different type of signal to determine the position of a vehicle, each could be incorporated within the present system by adding an appropriate receiver and navigation computer in place of GPS receiver 42. Any navigational aid will work in the current system if, with the addition of an appropriate navigation computer, it can accurately provide latitude and longitude of the receiving vehicle and a suitable timing reference signal.

Consequently, within the scope of the appended claims it is to be understood that the invention can be practiced otherwise than as specifically described herein.

The embodiments of the invention in which an exclusive property or privilege is claimed are defined as follows:

1. A traffic alert and collision avoidance system for preventing the collision of vehicles within an airspace, said system comprising:
   (a) a navigation signal generating network that emits navigational signals suitable for determining the position of a vehicle receiving the navigational signals; and
   (b) a plurality of vehicles,
      (i) each of said vehicles including a transmitter for: receiving navigational signals generated by the navigation signal generating network; determining the actual position of the vehicle based on the received navigational signals; determining an airspace volume element that forms part of a grid of volume elements within which the vehicle is located; and transmitting a collision avoidance signal that includes a navigation message containing data describing the actual position of the vehicle and a volume element code assigned to the airspace volume element within which said vehicle is located; and
      (ii) at least some of said vehicles including a receiver for receiving the collision avoidance signals produced by the transmitters of other vehicles, said receiver: selecting which received collision avoidance signals to evaluate based on the volume element code contained in the received collision avoidance signals; evaluating the selected collision avoidance signals to determine the range between the vehicles transmitting the selected collision avoidance signals and the vehicle receiving the selected collision avoidance signals based on the actual position data contained in the navigation message of the selected collision avoidance signals and the actual position of the vehicle receiving the selected collision avoidance signals; and generating a warning if the range between any of the vehicles transmitting the selected collision avoidance signals and the vehicle receiving the selected collision avoidance signals indicates a potential collision between the vehicles.

2. The traffic alert and collision avoidance system of claim 1, wherein the navigational signals emitted by the navigation signal generating network are Loran-C signals.

3. The traffic alert and collision avoidance system of claim 1, wherein the navigational signals emitted by the navigation signal generating network are OMEGA signals.

4. The traffic alert and collision avoidance system of claim 1, wherein the navigational signals emitted by the navigation signal generating network are VORTAC signals.

5. The traffic alert and collision avoidance system of claim 1, wherein the navigational signals are emitted by Global Positioning System (GPS) satellites.

6. The traffic alert and collision avoidance system of claim 5, wherein the transmitter includes a GPS receiver.

7. The traffic alert and collision avoidance system of claim 1, wherein the actual position of a vehicle is the latitude and longitude of the vehicle.

8. The traffic alert and collision avoidance system of claim 7, wherein the actual position of a vehicle includes the altitude of the vehicle.

9. The traffic alert and collision avoidance system of claim 1, wherein each volume element code is a unique nonmaximal-length pseudonoise sequence.

10. The traffic alert and collision avoidance system of claim 9, wherein the nonmaximal-length pseudonoise sequence is a Gold code.

11. The traffic alert and collision avoidance system of claim 10, wherein the set of Gold codes describing the grid of volume elements exhibits bounded and uniform autocorrelation and cross-correlation sidelobes.

12. The traffic alert and collision avoidance system of claim 1, wherein the grid of volume elements is bounded to cover a predetermined area.

13. The traffic alert and collision avoidance system of claim 12, wherein the volume element code describing each volume element in the grid of volume elements is repeated at distances equal to the size of the bounded grid.

14. The traffic alert and collision avoidance system of claim 1, wherein volume elements located at a constant latitude on the earth surface have the same dimensions.

15. The traffic alert and collision avoidance system of claim 14, wherein the vertical dimension of each volume element extends from sea level to the upper limit of Class A airspace.

16. The traffic alert and collision avoidance system of claim 14, wherein the size of each volume element varies with altitude.

17. The traffic alert and collision avoidance system of claim 1, wherein the transmitter transmits the collision avoidance messages on a common channel at intervals based on the maximal-length pseudorandom sequence.

18. The traffic alert and collision avoidance system of claim 17, wherein the receiver for receiving the collision avoidance signals shares a beacon antenna with the transmitter on a time-multiplexed basis.

19. The traffic alert and collision avoidance system of claim 18, wherein the time-multiplexed basis is based on a maximal-length pseudorandom sequence.

20. The traffic alert and collision avoidance system of claim 1, wherein the navigation message contains a vehicle identification number.

21. A traffic alert and collision avoidance transmitter for broadcasting a collision avoidance signal from a moving vehicle, said traffic alert and collision avoidance transmitter comprising:

(a) navigational means for determining the actual position of a vehicle containing the transmitter based on navigation signals produced by a navigation signal generating network;

(b) a navigation message generator for creating a navigation message that contains data describing the actual position of the vehicle;

(c) a volume element code generator for generating a unique code assigned to an airspace volume element of a grid of airspace volume elements within which the vehicle is located based on the actual position of the vehicle;

(d) a carrier signal generator for generating a carrier signal;

(e) a modulator for modulating the carrier signal by the navigation message and the volume element code to produce a collision avoidance signal; and (f) transmitting means for transmitting the collision avoidance signal.

22. The traffic alert and collision avoidance transmitter of claim 21, wherein said navigational means is a GPS receiver.

23. The traffic alert and collision avoidance transmitter of claim 22, wherein the carrier signal is derived from and phase coherent with a reference frequency from a GPS satellite signal.

24. The traffic alert and collision avoidance transmitter of claim 23, wherein the carrier signal is modulated by the navigation message and the volume element code using binary phase-shift keying (BPSK).

25. The traffic alert and collision avoidance transmitter of claim 23, wherein the carrier signal is modulated by the navigation message and the volume element code using quadrature phase-shift keying (QPSK).

26. The traffic alert and collision avoidance transmitter of claim 21, wherein the actual position of the vehicle is the latitude and longitude of the vehicle.

27. The traffic alert and collision avoidance transmitter of claim 26, wherein the actual position of the vehicle includes the altitude of the vehicle.

28. The traffic alert and collision avoidance transmitter of claim 21, wherein the unique code generated by the volume element code generator is a nonmaximal-length pseudonoise code.

29. The traffic alert and collision avoidance transmitter of claim 28, wherein the nonmaximal-length pseudonoise code is a Gold code.

30. The traffic alert and collision avoidance transmitter of claim 29, wherein the volume element code generator generates Gold codes that exhibit bounded and uniform autocorrelation and cross-correlation sidelobes with Gold codes generated for airspace volume elements surrounding the airspace volume element containing the vehicle.

31. The traffic alert and collision avoidance transmitter of claim 21, further comprising a second modulator for controlling the transmission of the collision avoidance signal in a binary manner such that the collision avoidance signal is randomly transmitted over a beacon antenna.

32. The traffic alert and collision avoidance transmitter of claim 31, wherein the binary manner is controlled by a maximal-length pseudorandom transmit/receive sequence.

33. The traffic alert and collision avoidance transmitter of claim 21, wherein the navigation message contains a vehicle identification number.

34. A traffic alert and collision avoidance receiver for receiving and decoding a collision avoidance message, said traffic alert and collision avoidance receiver comprising:

(a) navigational means for determining the actual position of a vehicle containing the receiver based on signals produced by a navigation signal generating network; and (b) receiving means for:

(i) receiving collision avoidance signals transmitted by other vehicles, the collision avoidance signals containing a navigation message containing data describing the position of the vehicle transmitting the collision avoidance signal and an airspace volume element code describing the airspace volume element of a grid of airspace volume elements within which the transmitting vehicle is located;

(ii) distinguishing collision avoidance signals produced by vehicles located in the same airspace volume element or airspace volume elements surrounding the airspace volume element in which the vehicle containing the receiver is located from collision avoidance signals produced by vehicles located in other airspace volume elements based on the airspace volume element code contained in the received collision avoidance signals;

(iii) decoding the navigation message contained in the collision avoidance signals produced by vehicles located in the same airspace volume element or the airspace volume elements surrounding the airspace volume element in which the vehicle containing the receiver is located in order to determine the position of said vehicles; and (iv) alerting an operator of the vehicle containing the receiver to the location of vehicles located in the same airspace volume element or the airspace volume elements surrounding the airspace volume element in which the vehicle containing the receiver is located.

35. The traffic alert and collision avoidance receiver of claim 34, wherein said receiving means also identifies the course of vehicles located in the same airspace volume element or the airspace volume elements surrounding the airspace volume elements in which the vehicle containing the receiver is located and generates a warning if the course of any such vehicle poses a potential conflict with a course of the vehicle containing the receiver.

36. The traffic alert and collision avoidance receiver of claim 34, wherein said navigational means is a GPS receiver.

37. The traffic alert and collision avoidance receiver of claim 36, wherein the actual position of the vehicle is the latitude and longitude of the vehicle.

38. The traffic alert and collision avoidance receiver of claim 37, wherein the actual position of the vehicle includes the altitude of the vehicle.

39. The traffic alert and collision avoidance receiver of claim 34, wherein the airspace volume element code is a nonmaximal-length pseudonoise code.

40. The traffic alert and collision avoidance receiver of claim 39, wherein the nonmaximal-length pseudonoise code is a Gold code.

41. The traffic alert and collision avoidance receiver of claim 34, wherein the reception of collision avoidance signals by the receiver is controlled by a binary transmit/receive sequence such that signals are received when the binary transmit/receive sequence is high and collision avoidance signals are not received when the binary transmit/receive sequence is low.

42. The traffic alert and collision avoidance receiver of claim 41, wherein the binary transmit/receive sequence is a maximal-length pseudorandom sequence.

43. A method of preventing a collision between a plurality of vehicles operating within an airspace, the method comprising:

(a) establishing a grid of volume elements within the airspace, each volume element within the grid of volume elements being assigned a unique volume element code;

(b) causing each of the plurality of vehicles to generate and transmit a collision avoidance signal, the collision avoidance signal transmitted by each vehicle comprising a navigation message containing data describing a position of the vehicle generating the collision avoidance signal and the unique volume element code corresponding to the volume element in which the vehicle generating the collision avoidance signal is located; and (c) causing some of the plurality of vehicles to receive the collision avoidance signals transmitted by the plurality of vehicles, each of the vehicles receiving the collision avoidance signals:

(i) selecting which received collision avoidance signals to evaluate based on the volume element code contained in the received collision avoidance signals;

(ii) evaluating the selected collision avoidance signals to determine the range between the vehicles transmitting the selected collision avoidance signals and the vehicle receiving the selected collision avoidance signals based on the position data contained in the navigation message of the selected collision avoidance signals and the position of the vehicle receiving the selected collision avoidance signals; and (iii) generating a warning if the range between any of the vehicles transmitting the selected collision avoidance signals and the vehicle receiving the selected collision avoidance signals indicates a potential collision between the vehicles.

44. The method of claim 43, wherein the position of the vehicle transmitting the collision avoidance signal is determined from a navigation signal generating network.

45. The method of claim 43, wherein the unique volume element code is a nonmaximal-length pseudonoise sequence.

46. The method of claim 45, wherein the nonmaximal-length pseudonoise sequence is a Gold code.

47. The method of claim 46, wherein the set of Gold codes describing the grid of volume elements exhibits bounded and uniform autocorrelation and cross-correlation sidelobes.

48. The method of claim 43, wherein the collision avoidance signals are transmitted by each vehicle on a common channel.

49. The method of claim 48, wherein the transmission occur at intervals based on a maximal-length pseudorandom sequence.

* * * * *

UNITED STATES PATENT AND TRADEMARK OFFICE
CERTIFICATE OF CORRECTION

PATENT NO. : 5,636,123
DATED : June 3, 1997
INVENTOR(S) : R.S. Rich et al.

It is certified that error appears in the above-indentified patent and that said Letters Patent is hereby corrected as shown below:

COLUMN      LINE

23              33          "elements in which" should read --element in which--
(Claim 35,      line 5)

24              53          "transmission" should read --transmissions--
(Claim 49,      line 1)

Signed and Sealed this

Thirtieth Day of September, 1997

*Attest:*

*Attesting Officer*

BRUCE LEHMAN

*Commissioner of Patents and Trademarks*